United States Patent [19]
Ueda

[11] Patent Number: 5,887,033
[45] Date of Patent: Mar. 23, 1999

[54] DATA TRANSFER DEVICE AND DATA TRANSFER METHOD

[75] Inventor: Katsuhiko Ueda, Sakai, Japan

[73] Assignee: Matsushita Electric Industrial Co., Ltd., Kadoma, Japan

[21] Appl. No.: 411,429

[22] Filed: Mar. 27, 1995

[30]     Foreign Application Priority Data

Mar. 29, 1994  [JP]  Japan .................................. 6-058652

[51] Int. Cl.⁶ .................................................. H04L 27/00
[52] U.S. Cl. ........................... 375/259; 375/368; 370/489
[58] Field of Search ..................... 375/257, 259, 375/260, 354, 368; 341/65, 59; 370/489

[56]               References Cited

U.S. PATENT DOCUMENTS

| | | | |
|---|---|---|---|
| 4,396,906 | 8/1983 | Weaver | 341/65 |
| 5,121,397 | 6/1992 | Norrod | 371/54 |
| 5,271,016 | 12/1993 | Hilden et al. | 371/37.1 |
| 5,278,960 | 1/1994 | Shibuya | 395/375 |

FOREIGN PATENT DOCUMENTS

| | | |
|---|---|---|
| 0444774 | 9/1991 | European Pat. Off. . |
| 4128914 | 4/1992 | Japan . |
| 5241704 | 9/1993 | Japan . |
| 5274257 | 10/1993 | Japan . |
| 2239113 | 6/1991 | United Kingdom . |

*Primary Examiner*—Chi H. Pham
*Assistant Examiner*—Bryan Webster
*Attorney, Agent, or Firm*—Renner, Otto, Boisselle & Sklar, P.L.L.

[57]                 ABSTRACT

A data transfer device connected to a bus and a control signal line, includes: a judgment circuit for judging whether or not a state change of the bus, which occurs in a case where the data is manipulated to be output to the bus, is smaller than the state change of the bus, which occurs in a case where data is output to the bus without manipulating the data; a first manipulation circuit for manipulating the data in accordance with the result of judgment; a first output circuit for selectively outputting one set of the data and the data manipulated by the first manipulation circuit to the bus in accordance with the result of judgment; and a second output circuit for outputting a control signal indicating the result of judgment to the control signal line.

25 Claims, 22 Drawing Sheets

FIG.4

|  | Preceding judgment signal 107 | Output of disagreeing number detection circuit 105 | Current judgment signal 107 |
|---|---|---|---|
| Case A | 0 | 0 ~ 1 | 0 |
| Case B |  | 4 ~ 8 | 1 |
| Case C | 1 | 0 ~ 3 | 1 |
| Case D |  | 4 ~ 8 | 0 |

FIG. 5

| Time | Output of output latch 103 | Output of disagreeing number detection circuit 105 | Judgment signal 107 | Output of terminal 111 | Number of state changes in external bus 119 | Output of internal bus 117 |
|---|---|---|---|---|---|---|
| 1 | 1 0 1 0 1 0 1 0 | 0 | 0 | 1 0 1 0 1 0 1 0 | — | 1 0 1 0 1 0 1 0 |
| 2 | 1 0 1 0 1 0 0 0 | 1 | 0 | 1 0 1 0 1 0 0 0 | 1 | 1 0 1 0 1 0 0 0 |
| 3 | 0 0 1 1 0 0 1 1 | 5 | 1 | 1 1 0 0 1 1 0 0 | 3 | 0 0 1 1 0 0 1 1 |
| 4 | 1 0 1 0 1 0 1 1 | 3 | 1 | 0 1 0 1 0 1 0 0 | 3 | 1 0 1 0 1 0 1 1 |
| 5 | 0 1 0 1 0 0 0 0 | 7 | 0 | 0 1 0 1 0 0 0 0 | 1 | 0 1 0 1 0 0 0 0 |

▒ indicates a bit whose state has changed

FIG. 7

| | Transfer data | | Number of changing bits |
|---|---|---|---|
| | Decimal notation | Binary notation | |
| Time n | 2 | 00000010 | |
| | | | ⟩ 2 |
| Time n+1 | 4 | 00000100 | |
| | | | ⟩ 7 |
| Time n+2 | −1 | 11111111 | |
| | | | ⟩ 1 |
| Time n+3 | −2 | 11111110 | |
| | | | ⟩ 7 |
| Time n+4 | 3 | 00000011 | |
| | | | ⟩ 7 |
| Time n+5 | −2 | 11111110 | |

FIG. 8

| | Transfer data decimal notation | Output of terminal 111 | Output of terminal 112 | Number of state changes in terminal |
|---|---|---|---|---|
| Time n | 2 | 00000010 | 0 | |
| | | | | ⟩ 2 |
| Time n+1 | 4 | 00000100 | 0 | |
| | | | | ⟩ 2 |
| Time n+2 | −1 | 00000000 | 1 | |
| | | | | ⟩ 1 |
| Time n+3 | −2 | 00000001 | 1 | |
| | | | | ⟩ 2 |
| Time n+4 | 3 | 00000011 | 0 | |
| | | | | ⟩ 2 |
| Time n+5 | −2 | 00000001 | 1 | |

FIG. 9

| Case | Number of agreeing bits | Number of disagreeing bits | Number of combinations causing case | Probability of occurrence | Number of changing bits | |
|---|---|---|---|---|---|---|
| | | | | | Conventional data transfer device | Data transfer device of the present invention |
| 0 | 0 | 8 | 1 | 0.004 | 0.031 | 0.000 |
| 1 | 1 | 7 | 8 | 0.031 | 0.219 | 0.031 |
| 2 | 2 | 6 | 28 | 0.109 | 0.656 | 0.219 |
| 3 | 3 | 5 | 56 | 0.219 | 1.094 | 0.656 |
| 4 | 4 | 4 | 70 | 0.273 | 1.094 | 1.094 |
| 5 | 5 | 3 | 56 | 0.219 | 0.656 | 0.656 |
| 6 | 6 | 2 | 28 | 0.109 | 0.219 | 0.219 |
| 7 | 7 | 1 | 8 | 0.031 | 0.031 | 0.031 |
| 8 | 8 | 0 | 1 | 0.004 | 0.000 | 0.000 |
| Total | | | 256 | 1.000 | 4.000 | 2.906 |

FIG.11

| | Output of disagreeing number detection circuit 505 | Current judgment signal 107 |
|---|---|---|
| Case A | 0 ~ 3 | 0 |
| Case B | 4 ~ 8 | 1 |

| Time | Output of output latch 103 | Output of disagreeing number detection circuit 505 | Judgment signal 107 | Output of terminal 111 | Number of state changes in external bus 119 | Output of internal bus 117 |
|---|---|---|---|---|---|---|
| 1 | 1 0 1 0 1 0 1 0 | 0 | 0 | 1 0 1 0 1 0 1 0 | — | 1 0 1 0 1 0 1 0 |
| 2 | 1 0 1 0 1 0 0 0 | 1 | 0 | 1 0 1 0 1 0 0 0 | 1 | 1 0 1 0 1 0 0 0 |
| 3 | 0 0 1 1 0 0 1 1 | 5 | 1 | 1 1 0 0 1 1 0 0 | 3 | 0 0 1 1 0 0 1 1 |
| 4 | 1 0 1 0 1 0 1 1 | 5 | 1 | 0 1 0 1 0 1 0 0 | 3 | 1 0 1 0 1 0 1 1 |
| 5 | 0 1 0 1 0 0 0 0 | 1 | 0 | 0 1 0 1 0 0 0 0 | 1 | 0 1 0 1 0 0 0 0 | indicates a bit whose state has changed

FIG. 15

| Case | Number of agreeing bits | Number of disagreeing bits | Number of combinations | Probability of occurrence | Number of changing bits | |
|---|---|---|---|---|---|---|
| | | | | | Conventional data transfer device | Data transfer device of the present invention |
| 0 | 0 | 16 | 1 | 0.000 | 0.000 | 0.000 |
| 1 | 1 | 15 | 16 | 0.000 | 0.004 | 0.000 |
| 2 | 2 | 14 | 120 | 0.002 | 0.026 | 0.004 |
| 3 | 3 | 13 | 560 | 0.009 | 0.111 | 0.026 |
| 4 | 4 | 12 | 1,820 | 0.028 | 0.333 | 0.111 |
| 5 | 5 | 11 | 4,368 | 0.067 | 0.733 | 0.333 |
| 6 | 6 | 10 | 8,008 | 0.122 | 1.222 | 0.733 |
| 7 | 7 | 9 | 11,440 | 0.175 | 1.571 | 1.222 |
| 8 | 8 | 8 | 12,870 | 0.196 | 1.571 | 1.571 |
| 9 | 9 | 7 | 11,440 | 0.175 | 1.222 | 1.222 |
| 10 | 10 | 6 | 8,008 | 0.122 | 0.733 | 0.733 |
| 11 | 11 | 5 | 4,368 | 0.067 | 0.333 | 0.333 |
| 12 | 12 | 4 | 1,820 | 0.028 | 0.111 | 0.111 |
| 13 | 13 | 3 | 560 | 0.009 | 0.026 | 0.026 |
| 14 | 14 | 2 | 120 | 0.002 | 0.004 | 0.004 |
| 15 | 15 | 1 | 16 | 0.000 | 0.000 | 0.000 |
| 16 | 16 | 0 | 1 | 0.000 | 0.000 | 0.000 |
| Total | | | 65,536 | 1.000 | 8.000 | 6.429 |

FIG. 16

| Case | Preceding transfer data | Current transfer data | Number of state changes of bits | | Effect of bit transposition |
|---|---|---|---|---|---|
| | | | Case where bit transposition is not performed | Case where bit transposition is performed | |
| a | 0 0 | 0 0 | 0 | 0 | No |
| b | 0 0 | 0 1 | 1 | 1 | No |
| c | 0 0 | 1 0 | 1 | 1 | No |
| d | 0 0 | 1 1 | 2 | 2 | No |
| e | 0 1 | 0 0 | 1 | 1 | No |
| f | 0 1 | 0 1 | 0 | 2 | No |
| g | 0 1 | 1 0 | 2 | 0 | Yes |
| h | 0 1 | 1 1 | 1 | 1 | No |
| i | 1 0 | 0 0 | 1 | 1 | No |
| j | 1 0 | 0 1 | 2 | 0 | Yes |
| k | 1 0 | 1 0 | 0 | 2 | No |
| l | 1 0 | 1 1 | 1 | 1 | No |
| m | 1 1 | 0 0 | 2 | 2 | No |
| n | 1 1 | 0 1 | 1 | 1 | No |
| o | 1 1 | 1 0 | 1 | 1 | No |
| p | 1 1 | 1 1 | 0 | 0 | No |

FIG.18

|  | Output of pattern detecting circuit 1505 | Judgment signal 1507 |
|---|---|---|
| Case A | 0 ~ 1 | 0 |
| Case B | 2 ~ 3 | 1 |

| Time | Output of output of latch 103 | Output of pattern detecting circuit 1505 | Judgment signal 107 | Output of terminal 111 | Number of state changes in external bus 119 | Output of internal bus 117 |
|---|---|---|---|---|---|---|
| 1 | 1 0 1 0 1 0 1 0 | 0 | 0 | 1 0 1 0 1 0 1 0 | — | 1 0 1 0 1 0 1 0 |
| 2 | 0 1 0 1 0 1 0 0 | 3 | 1 | 1 0 1 0 1 0 0 0 | 1 | 0 1 0 1 0 1 0 0 |
| 3 | 0 1 0 1 0 1 1 1 | 3 | 1 | 1 0 1 0 1 0 1 1 | 2 | 0 1 0 1 0 1 1 1 |
| 4 | 1 0 1 0 1 0 0 1 | 0 | 0 | 1 0 1 0 1 0 0 1 | 1 | 1 0 1 0 1 0 0 1 | indicates a bit whose state has changed

DATA TRANSFER DEVICE AND DATA TRANSFER METHOD

BACKGROUND OF THE INVENTION

1. Field of the Invention

The present invention relates to a data transfer device and a data transfer method for transferring data with low power consumption.

2. Description of the Related Art

Dynamic power consumption (P) of a data transfer line is generally expressed by the expression:

$$P = fCV^2$$

where f is the number of times of charge and discharge, C is a load capacitance, and V is a voltage applied to the load capacitance. But structures are adopted as data transfer lines in many integrated circuits for processing data for simplification of internal structures. However, since the bus is long and a number of resources are connected to the bus, the load capacitance of the bus is large in many cases. This results in an increase in power consumption.

Japanese Laid-Open Patent Publication No. 4-128914 discloses a data transfer device for reducing the load capacitance of an internal bus. In the data transfer device, the internal bus is divided into two parts: a main data bus and an input/output bus. The main data bus and the input/output data bus are connected to each other via a bidirectional buffer only when data is output to the exterior of the integrated circuit.

However, the external bus has a remarkably larger load capacitance than that of the internal bus. This is because while the internal bus of the integrated circuit has a line width of a micrometer order and a line length of a millimeter order, the external bus which is connected to a terminal of the integrated circuit has a line width of a millimeter order and a line length of a centimeter order. Therefore, in kinds of integrated circuits which should transfer data to the exterior of the integrated circuits, power, which is consumed at the terminal, increases. As described above, the integrated circuit suffers from a problem that a remarkable reduction in the consumption power cannot be expected only by reducing the load capacitance of the internal bus.

SUMMARY OF THE INVENTION

The data transfer device of this invention which is connected to a bus and a control signal line, includes: judgment means for judging whether or not a state change of the bus, which occurs in a case where the data is manipulated to be output to the bus, is smaller than the state change of the bus, which occurs in a case where data is output to the bus without manipulating the data; first manipulation means for manipulating the data in accordance with the result of judgment; first output means for selectively outputting one set of the data and the data manipulated by the first manipulation means to the bus in accordance with the result of judgment; and second output means for outputting a control signal indicating the result of judgment to the control signal line.

In one embodiment of the invention, the judgment means includes: first holding means for holding a preceding result of judgment; second holding means for holding the preceding data upon receiving current data; and determination means for determining whether the current data is to be manipulated or not in accordance with the preceding result of judgment, the preceding data and the current data.

In another embodiment of the invention, the determination means comprises: disagreeing number detection means for outputting the number of bits disagreeing between the preceding data and the current data; and means for outputting a signal indicating whether the current data is to be manipulated or not in accordance with the preceding result of judgment and the output of the disagreeing number detection means.

In still another embodiment of the invention, the determination means includes: pattern detection means for outputting the number of patterns agreeing with a relationship between the current data and the preceding data, out of a predetermined number of patterns which are previously prepared in accordance with the preceding result of judgment; and means for outputting a signal indicating whether the current data is to be manipulated or not in accordance with the output of the pattern detection means.

In still another embodiment of the invention, the judgment means includes determination means for determining whether the current data is to be manipulated or not in accordance with a current state of the bus and the current data.

In still another embodiment of the invention, the determination means includes: disagreeing number detection means for outputting the number of bits disagreeing between the current state of the bus and the current data; and means for outputting a signal indicating whether the current data is to be manipulated or not in accordance with the output of the disagreeing number detection means.

In still another embodiment of the invention, the determination means includes: pattern detection means for outputting the number of patterns agreeing with a relationship between the current state of the bus and the current data, out of the predetermined number of patterns which are previously prepared; and means for outputting a signal indicating whether the current data is to be manipulated or not in accordance with the output of the pattern detection means.

In still another embodiment of the invention, the data is part of data supplied to the data transfer device via an entire bus, and the bit width of the bus is smaller than that of the entire bus.

In still another embodiment of the invention, the first manipulation means executes at least one of bit inversion, bit order transportation and data compression.

In still another embodiment of the invention, a data transfer device further includes second manipulation means of receiving data output from the first output means via the bus and the control signal indicating the result of judgment output from the second output means via the control signal line, and for manipulating the data in accordance with the control signal.

In still another embodiment of the invention, the second manipulation means executes at least one of bit inversion, bit order transposition and data expansion.

Alternatively, the data transfer device includes: a transmission section for transmitting data and a control signal; a bus connected to the transmission section, for carrying the data; a control signal line connected to the transmission section, for carrying the control signal; and a receiving section connected to the bus and the control signal line, for receiving the data via the bus and the control signal via the control signal line, wherein the transmission section includes: judgment means for judging whether or not a state change in the bus, which occurs in a case where the data is manipulated to be output to the bus, is smaller than a state change in the bus, which occurs in a case where the data is output to the bus without manipulating the data; first manipulation means for manipulating the data in accordance with the result of judgment; first output means for selectively outputting one set of the data and data manipulated by the first manipulation means, in accordance with the result of judgment; and second output means for outputting a control signal indicating the result of judgment to the control signal line, and wherein the receiving section includes: second manipulation means for receiving data output from the first output means via the bus and the control signal indicating the result of judgment output from the second output means via the control signal line, and for manipulating the data in accordance with the control signal.

In one embodiment of the invention, the judgment means of the transmission section includes: first holding means for holding a preceding result of judgment; second holding means for holding the preceding data upon receiving current data; and determination means for determining whether the current data is to be manipulated or not in accordance with the preceding result of judgment, the preceding data and the current data.

In another embodiment of the invention, the judgment means of the transmission section includes determination means for determining whether current data is to be manipulated or not in accordance with a current state of the bus and the current data.

In another aspect of the present invention, a data transfer method includes the steps of: judging whether or not a state change in the bus, which occurs in a case where the data is manipulated to be output to the bus, is smaller than a state change in the bus, which occurs in a case where data is output to the bus without manipulating the data; performing a first manipulation of the data in accordance with the result of judgment; and transferring the manipulated data in accordance with the result of judgment.

In one embodiment of the invention, the first manipulation includes at least one of bit inversion, bit order transposition and data compression.

In another embodiment of the invention, the data transfer method further includes a step of reproducing the data by performing a second manipulation of the data in accordance with the result of judgment, the second manipulation being opposite to the first manipulation.

In still another embodiment of the invention, the second manipulation includes at least one of bit inversion, bit order transposition and data expansion.

Thus, the invention described herein makes possible the advantages of (1) providing a data transfer device for transferring data with low power consumption and (2) providing a data transfer method for transferring data with low power consumption.

These and other advantages of the present invention will become apparent to those skilled in the art upon reading and understanding the following detailed description with reference to the accompanying figures.

BRIEF DESCRIPTION OF THE DRAWINGS

FIG. 4 shows the logic defining the operation of a judgment circuit 106 in the data transfer device of Example 1.

FIG. 5 shows an example of the operation of the data transfer device of Example 1 in a time series.

FIG. 7 shows the number of bits whose states have changed on an external bus 119 in the case where data is transferred by a conventional data transfer device.

FIG. 8 shows the number of bits whose states have changed on terminals 111 and 112 in the case where data is transferred by the data transfer device of Example 1.

FIG. 9 shows the reduction effects in the power consumption owing to the data transfer device of Example 1.

FIG. 11 shows the logic defining the operation of a judgment circuit 506 in the data transfer device of Example 2.

FIG. 15 shows the reduction effects in the power consumption owing to the data transfer device of Example 3.

FIG. 16 shows the principle of reducing the power consumption by transposing a bit order of data.

FIG. 18 shows the logic defining the operation of a judgment circuit 1506 in the data transfer device of Example 4.

DESCRIPTION OF THE PREFERRED EMBODIMENTS

Figure 1:
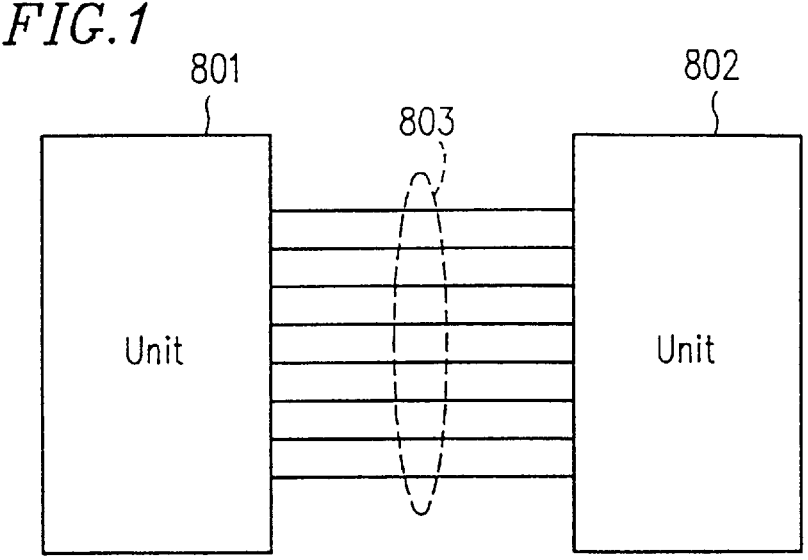
FIG. 1 is a diagram illustrating the principle of the present invention.

First, the principle of the present invention is described with reference to FIG. 1. A unit 801 and a unit 802 are connected to each other through a wiring 803. It is assumed that data, which is composed of a plurality of bits, is transferred from the unit 801 to the unit 802 via the wiring 803. Since the wiring 803 has a load capacitance, charge and discharge occur due to such data transfer, resulting in consumption of power. For example, when b'10101010 (hereinafter, b' represents a binary notation) is transferred from the unit 801 to the unit 802 through the wiring 803, followed by transfer of b'01010101 from the unit 801 to the unit 802 through the wiring 803, the power consumption of the wiring 803 is maximized. This is because the charge and discharge occur in all of the bits of the wiring 803 due to inversion of all bits of the transfer data. The present invention provides a data transfer device and a data transfer method, for transferring data obtained by manipulating the b' 01010101 and information indicating that true data is data obtained by manipulating the data b'01010101, instead of transferring the data b'01010101. For example, the data transfer device and the data transfer method according to the present invention transfer, instead of the data b' 01010101, data b' 10101010 obtained by inverting the data b' 01010101 and information of 1 bit indicating that true data is data obtained by inverting the bits of this data. With this operation, the power consumption of the wiring 803 is minimized. It is for this reason that the state of each bit of the wiring 803 does not change before and after the transfer of data.

This data processing is not limited to bit inversion. In the present specification, "manipulation of data" includes bit inversion, transposition of bit order, compression/expansion of data, or a combination thereof, and includes any manipulations as long as the state change of the wiring 803 is reduced by the manipulation.

The wiring 803 may be either an internal bus or an external bus. As described above, however, the external bus has a remarkably larger load capacitance than that of the internal bus. Therefore, the present invention is particularly effective in the case where the wiring 803 is the external bus. When the unit 801 and the unit 802 are included in one integrated circuit, the wiring 803 is referred to as an internal bus. When the unit 802 is included in one integrated circuit and the unit 802 is included in another integrated circuit, the wiring 803 is referred to as an external bus.

Figure 2:
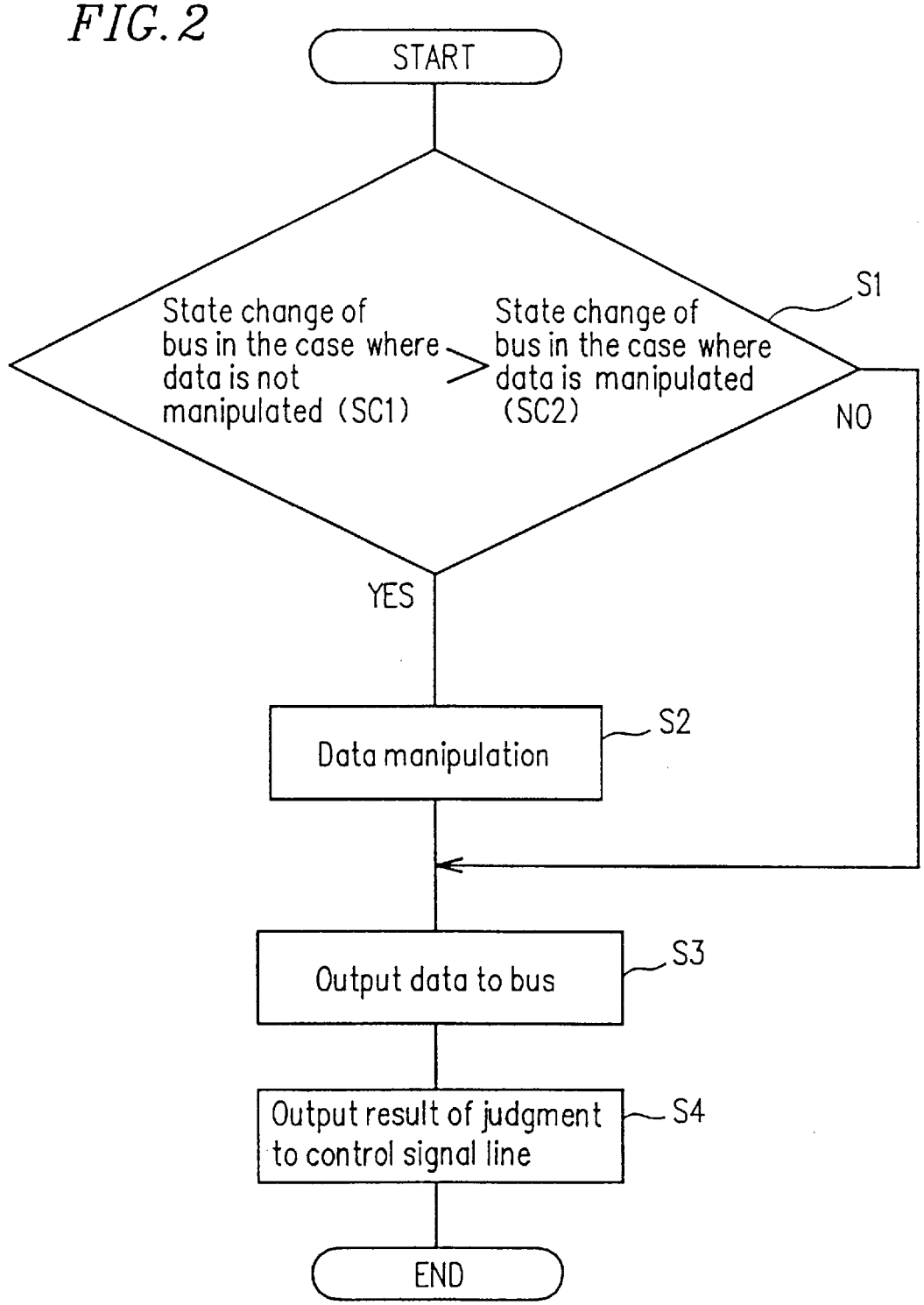
FIG. 2 is a flow-chart showing a procedure for a data transfer method according to the present invention.

FIG. 2 shows a procedure of data transfer according to the present invention.

At step S1, it is judged whether or not a state change (SC1) of the bus, which occurs in the case where data is output to the bus without manipulating the data, is smaller than a state change (SC2) of the bus, which occurs in the case where manipulated data is output to the bus.

If the state change (SC2) of the bus is judged to be smaller than the state change (SC1) of the bus, the data is manipulated (Step S2), the manipulated data is output to the bus (Step S3), and information (for example, b'1) indicating the result of judgment at Step S1 is output to a control signal line (Step S4).

If the state change (SC2) of the bus is judged to be equal to or larger than the state change (SC1) of the bus, the data is output to the bus without being manipulated (Step S3), and information (for example, b'0) indicating the result of judgment at Step S1 is output to the control signal line (Step S4).

The order of Steps S3 and S4 may be reversed.

EXAMPLE 1

Figure 3:
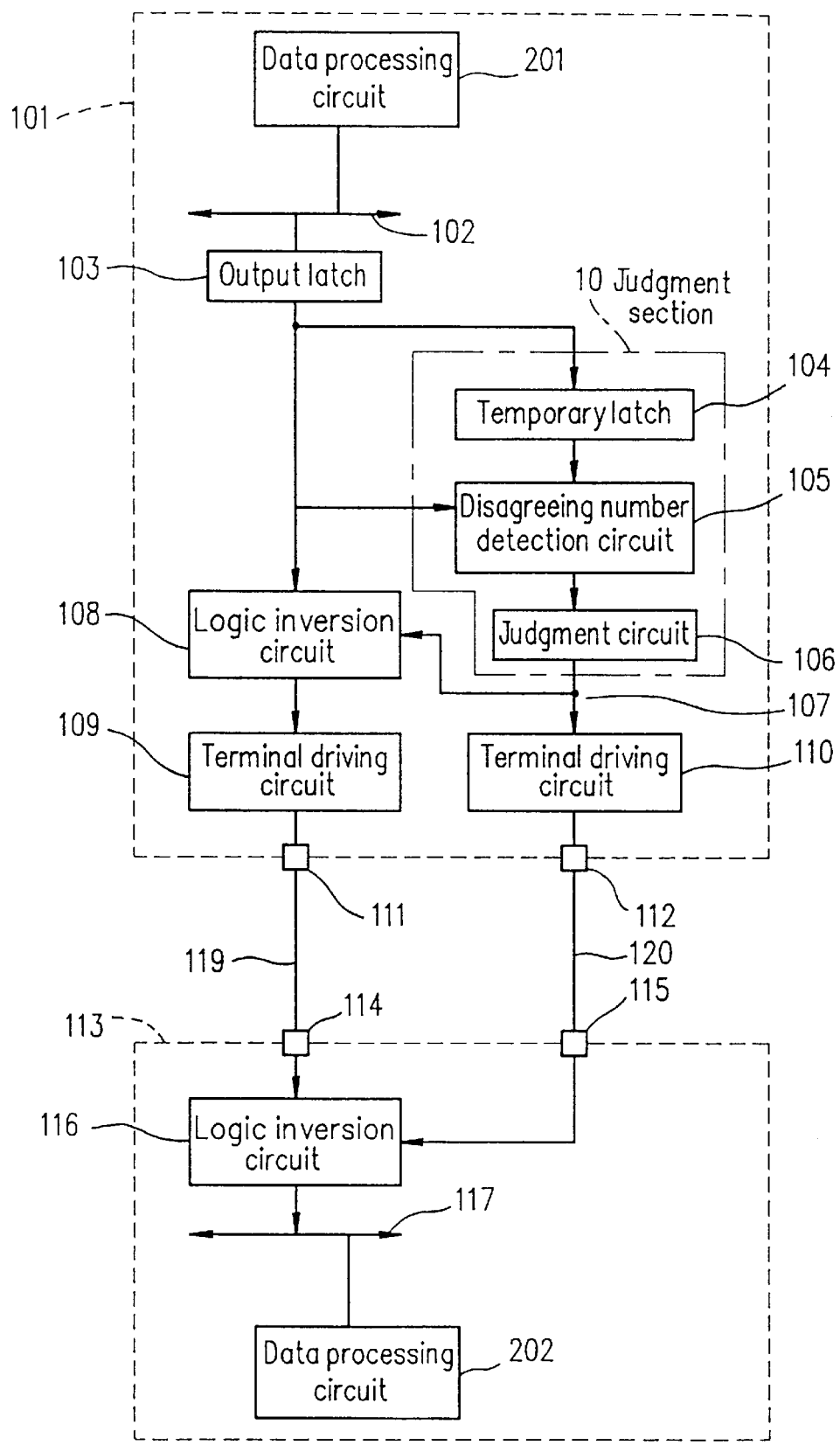
FIG. 3 is a diagram showing a configuration for a data transfer device according to Example 1 of the present invention.

FIG. 3 shows a configuration for a first example of a data transfer device according to the present invention. The data transfer device includes integrated circuits 101 and 113. The integrated circuit 101 is connected to an external bus 119 via a terminal 111, and is further connected to a signal line 120 via a terminal 112. The integrated circuit 113 is connected to the external bus 119 via a terminal 114, and is further connected to a signal line 120 via a terminal 115. The bus 119 is composed of, for example, 8 bits. The signal line 120 is composed of, for example, 1 bit.

The integrated circuit 101 includes an internal bus 102, an output latch 103, a judgment section 10, a logic inversion circuit 108, terminal driving circuits 109 and 110, and a data processing circuit 201.

The internal bus 102, which is provided in the integrated circuit 101, is for transferring data.

The output latch 103 is connected to the internal bus 102 and temporarily holds data to be output to the exterior of the integrated circuit 101. The output latch 103 is composed of, for example, 8 bits. For example, data is given to the output latch 103 from the data processing circuit 201 via the internal bus 102.

The judgment section 10 judges whether or not the state change of the external bus 119, which occurs in the case where data, whose logic level is inverted, is output to the external bus 119, is smaller than that which occurs in the case where data is output to the external bus 119 without inverting the logic level of the data, thereby outputting a judgment signal 107 indicating the result of judgment. The judgment section 10 has a temporary latch 104, a disagreeing number detection circuit 105 and a judgment circuit 106.

Each time new data is written to the output latch 103, the temporary latch 104 latches the data which is latched in the output latch 103 until the new data is written. The temporary latch 104 is composed of, for example, 8 bits.

The disagreeing number detection circuit 105 compares an output of the output latch 103 with an output of the temporary latch 104 for each bit, and outputs the number of disagreeing bits between the output of the output latch 103 and the output of the temporary latch 104.

The judgment circuit 106 outputs a judgment signal 107 based on an output of the disagreeing number detection circuit 105 and a preceding self-output. The operation of the judgment circuit 106 will be described below.

The logic inversion circuit 108 manipulates the output of the output latch 103 in accordance with the judgment signal 107 output from the judgment circuit 106. In the case where the judgment signal 107 is at a logic level 1, the logic inversion circuit 108 inverts the logic level of the output of the output latch 103. In the case where the judgment signal 107 is at a logic level 0, the logic inversion circuit 108 allows the output of the output latch 103 to pass through without inverting the output.

The terminal driving circuit 109 drives the terminal 111 in order to output the output of the logic inversion circuit 108 to the exterior of the integrated circuit 101. The terminal driving circuit 110 drives the terminal 112 in order to output the judgment signal 107 output from the judgment signal 106 to the exterior of the integrated circuit 101.

The integrated circuit 113 has the logic inversion circuit 116, the internal bus 117 and a data processing circuit 202.

The logic inversion circuit 116 receives an 8-bit signal via the terminal 114, and manipulates the 8-bit signal in accordance with the logic level of the terminal 115. In the case where the logic level of the terminal 115 is 1, the logic inversion circuit 116 inverts the logic level of the 8-bit signal. In the case where the logic level of the terminal 115 is 0, the logic inversion circuit 116 allows the 8-bit signal to pass through without inverting the signal.

The internal bus 117, which is provided in the integrated circuit 113, is for transferring data. The output of the logic inversion circuit 116 is given to the data processing circuit 202 via the internal bus 117, for example.

FIG. 4 shows the logic which defines the operation of the judgment circuit 106. As shown in FIG. 4, the operation of the judgment circuit 106 is defined, depending on each of the cases A, B, C and D. For example, case A shows the operation of the judgment circuit 106 in the case where the judgment circuit 106 outputs the judgment signal 107 having a logic level 0 in the preceding judgment and the disagreeing number detection circuit 105 outputs any one of 0, 1, 2 or 3 in the current judgment. In this case, the judgment circuit 106 outputs a judgment signal of 0, which is the same as the preceding judgment signal 107, as the current judgment signal 107. Case B shows the operation of the judgment circuit 106 in the case where the judgment circuit 106 outputs the judgment signal 107 having a logic level 0 in the preceding judgment and the disagreeing number detection circuit 105 outputs any one of 4, 5, 6, 7 or 8 in the current judgment. In the case, the judgment circuit 106 outputs a judgment signal of 1, which is different from the preceding judgment signal 107. Cases C and D show the relationship between the output of the disagreeing number detection circuit 105 and the current judgment signal 107 in the case where the judgment signal 106 outputs the judgment signal having a logic level 1 in the preceding judgment.

FIG. 5 shows examples of the operation of the data transfer device according to Example 1 in a time series. Hereinafter, how the data transfer device operates at times 1, 2, 3, 4 and 5 shown in FIG. 5 will be respectively described.

Time 1

Assuming the b'10101010 is stored in the output latch 103 and the judgment signal 107 is 0 at time 1, the output of the output latch 103 passes through the logic inversion circuit 108 without being inverted. As a result, the terminal driving circuit 109 drives the external bus 119 with the value of b'10101010.

The judgment signal 107 of 0 is transferred to the interior of the integrated circuit 113 via the terminal driving circuit 110 and the terminals 112 and 115. Since the logic inversion circuit 116 does not perform an inversion operation, the signal on the external bus 119 passes through the logic inversion circuit 116 via the terminal 114, and is transferred to the internal bus 117. In this way, b'10101010, which is stored in the output latch 103, is output to the internal bus 117.

Time 2

Data b'10101000 is written to the output latch 103 via the internal bus 102 at time 2. Simultaneously with the writing to the output latch 103, b'10101010, which is stored in the output latch 103 until then, is stored in the temporary latch 104. The disagreeing number detection circuit 105 compares the output b'10101000 of the output latch 103 with the output b'10101010 of the temporary latch 104 for each bit, and outputs a value 1. The value 1 indicates the number of bits which disagree between the output b'10101000 of the output latch 103 and the output b'10101010 of the temporary latch 104. The judgment circuit 106 judges that the current state corresponds to case A of FIG. 4, and therefore outputs the judgment signal 107 having a logic level of 0.

The output of the output latch 103 passes through the logic inversion circuit 108, and the terminal driving circuit 109 drives the external bus 119 with the value of b'10101000. Since the state of the external bus 119 at time 1 is b'10101010, the state of the external bus 119 changes by 1 bit due to the current output of b'10101000. As a result, the power corresponding to the state change of 1 bit is consumed.

The judgment signal 107 having a logic level 0 is transferred to the interior of the integrated circuit 113 via the terminal driving circuit 110, and the terminals 112 and 115. Since the logic inversion circuit 116 does not perform the inversion operation, the signal on the external bus 119 passes through the logic inversion circuit 116 via the terminal 114, and is transferred to the internal bus 117. In this way, b'10101000 stored in the output latch 103 is output to the internal bus 117.

Time 3

Data b'00110011 is written to the output latch 103 via the internal bus 102 at time 3. Simultaneously with the writing to the output latch 103, b'10101010, which is stored in the output latch 103 until then, is stored in the temporary latch 104. The disagreeing number detection circuit 105 compares the output b'00110011 of the output latch 13 with the output b'10101000 of the temporary latch 104 for each bit, and outputs a value 5. The value 5 indicates the number of bits which disagree between the output b'10101000 of the temporary latch 104. The judgment circuit 106 judges that the current state corresponds to case B of FIG. 4, and outputs the judgment signal 107 having a logic level of 1.

The output of the output latch 103 is inverted by the logic inversion circuit 108. As a result, the terminal driving circuit 109 drives the external bus 119 with the value b'11001100. Since the state of the external bus 119 at time 2 is b'10101000, the state of the external bus 119 changes by 3 bits due to the current output of the b'11001100. As a result, the power consumption corresponds to a three bit state change.

The judgment signal 107 of 1 is transferred to the interior of the integrated circuit 113 via the terminal driving circuit 110, and the terminals 112 and 115. Since the logic inversion circuit 116 performs the inversion operation, the signal on the external bus 119 is inverted by the logic inversion circuit 116 via the terminal 114, and the thus inverted signal is transferred to the internal bus 117. In this way, b'00110011, which is stored in the output latch 103, is output to the internal bus 117.

The content of the output latch 103 at time 3 changes by 5 bits, as compared with the content of the output latch 103 at time 2. However, the state of the external bus 119 changes by 3 bits. Thus, even if the state change of the signal line 120 from 0 to 1 is added, the state change of only 4 bits occurs.

Time 4

Data b'10101011 is written to the output latch 103 via the internal bus 102 at time 4. Simultaneously with the writing to the output latch 103, b'00110011, which is stored in the output latch 103 until then, is stored in the temporary latch 104. The disagreeing number detection circuit 105 compares the output b'10101011 of the output latch 103 with the output b'00110011 of the temporary latch 104 for each bit, and outputs a value of 3. The value 3 indicates the number of bits which disagree between the output b'10101011 of the output latch 103 and the output b'00110011 of the temporary latch 104. The judgment circuit 106 judges that the current state corresponds to case C of FIG. 4 and outputs the judgment signal 107 having a logic level 1.

The output of the output latch 103 is inverted by the logic inversion circuit 108. As a result, the terminal driving circuit 109 drives the external bus 119 with the value of b'01010100. Since the state of the external bus 119 at time 3 is b'11001100, the state of the external bus 119 changes by 3 bits due to the current output of the b'01010100. As a result, the power consumption corresponds to a three bit state change.

The judgment signal 107 of 1 is transferred to the interior having a logic level the integrated circuit 113 via the terminal driving circuit 110, and the terminals 112 and 115. Since the logic inversion circuit 116 performs the inversion operation, the signal on the external bus 119 is inverted by the logic inversion circuit 116 via the terminal 114, and the thus inverted signal is transferred to the internal bus 117. In this way, b'10101011 stored in the output latch 103 is output to the internal bus 117.

Time 5

Data b'01010000 is written to the output latch 103 via the internal bus 102 at time 5. Simultaneously with the writing to the output latch 103, b'10101011, which is stored in the output latch 103 until then, is stored in the temporary latch 104. The disagreeing number detection circuit 105 compares the output b'01010000 of the output latch 103 with the output b'10101011 of the temporary latch 104 for each bit, and outputs a value 7. The value 7 indicates the number of bits which disagree between the output b'01010000 of the output latch 103 and the output b'10101011 of the temporary latch 104. The judgment circuit 106 judges that the current state corresponds to the case D of FIG. 4, and outputs the judgment signal 107 having a logic level 0.

The output of the output latch 103 passes through the logic inversion circuit 108, and the terminal driving circuit 109 drives the external bus 119 with the value of b'01010000. Since the state of the external bus 119 at time 4 is b'01010100, the state of the external bus 119 changes by 1 bit due to the current output of b'01010000. As a result, the power consumption corresponds to a one bit state change.

The judgment signal 107 of 0 is transferred to the interior having a logic level the integrated circuit 113 via the terminal driving circuit 101, and the terminals 112 and 115. Since the logic inversion circuit 116 does not perform the inversion operation, the signal on the external bus 119 passes through the logic inversion circuit 116 via the terminal 114, and is transferred to the internal bus 117. In this way, b'01010000, which is stored in the output latch 103, is output to the internal bus 117.

The content of the output latch 103 at time 5 is changed by 7 bits, as compared with the content of the output latch 103 at time 4. However, the state change of the external bus 119 is 1 bit. Thus, even if the state change of the signal line 120 from 1 to 0 is added, a state change of only 2 bits occurs.

Figure 6:
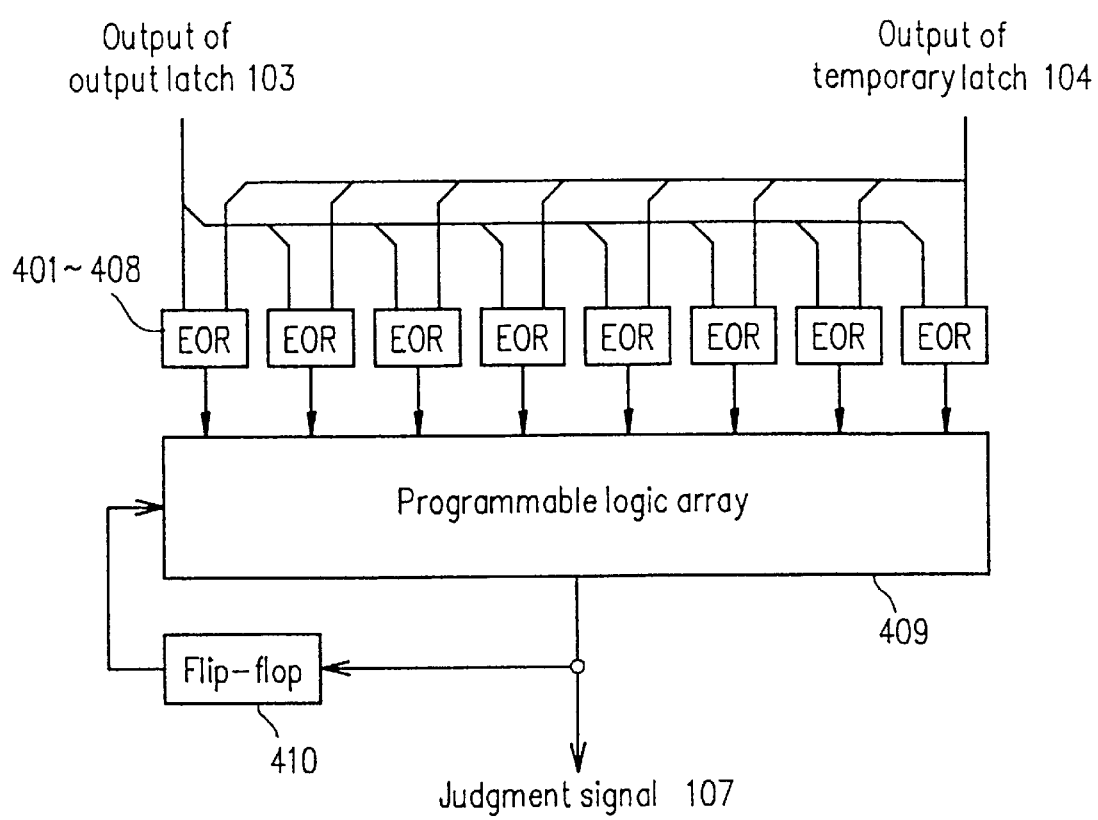
FIG. 6 is a diagram showing a configuration of a disagreeing number detection circuit 105 and the judgment circuit 106 in the data transfer device of Example 1.

FIG. 6 shows an example of a circuit configuration of the disagreeing number detection circuit 105 and the judgment circuit 106. The disagreeing number detection circuit 105 is realized by, for example, exclusive-OR circuits 401 through 408. The exclusive-OR circuits 401 through 408 detect the disagreement for each bit between the output of the output latch 103 and the output of the temporary latch 104. The judgment circuit 106 is realized by, for example, a programmable logic array 409 and a flip-flop 410. The programmable logic array 409 and the flip-flop 410 realize the logic shown in FIG. 4. The flip-flop 410 holds the preceding judgment signal 107.

As described above, in the data transfer device of Example 1, the judgment circuit 106 judges to which case of the cases A through D in FIG. 4 the current state corresponds, and outputs the judgment signal 107 indicating the result of judgment. The logic inversion circuit 108 manipulates the output of the output latch 103 in accordance with the logic level of the judgment signal 107. In the case where the logic level of the judgment signal 107 is 1, the output of the output latch 103 is inverted by the logic inversion circuit 108, and the thus inverted signal is output to the external bus 119. In the case where the logic level of the judgment signal 107 is 0, the output of the output latch 103 is output to the external bus 119 without being inverted. In this way, the state change of the external bus 119 can be reduced. As a result, the power consumed in the external bus 119 can be also reduced.

Moreover, in Example 1, in order to reduce the state change of the external bus 119, the logic inversion processing alone is performed with respect to the output of the output latch 103. Instead of this processing, a transposition processing of the bit order may be performed with respect to the output of the output latch 103. Alternatively, both of the transposition processing of bit order and the logic inversion processing can be used. Moreover, other processing methods may be used together.

In order to realize these processings, a disagreeing number detection circuit 105, a judgment circuit 106, a logic inversion circuit 108 and the like are required. However, the increase in the power consumption due to these additional circuits is small. This is because the additional circuits are disposed in the integrated circuit, and the processing is a logical operation along such as bit inversion or transposition of bit order. Moreover, as compared with the increase in the power consumption due to the additional circuits, a reduction in the power consumption owing to diminution in the state change of the external bus 119 is remarkably large. In particular, in the case where the bit width of the external bus 119 is large, this tendency becomes conspicuous.

Next, the effects of the data transfer device according to Example 1 will be more specifically described.

FIG. 7 shows the number of bits whose states have changed on the external bus 119 in the case where data is transferred by a conventional data transfer device. Herein, the conventional data transfer device indicates a data transfer device for transferring 8-bit data without performing a bit inversion operation. Assume that data of 2, 4, −1, −2, 3 and −2 in decimal notation are sequentially transferred from the integrated circuit 101 to the integrated circuit 113 via the external bus 119 from time n to time n+5. Herein, the data of negative numbers are represented in a two's complement device. In the case where the data of negative numbers are represented in the two's complement device as in this case, the number of bits whose states have changed on the external bus 119 increases when positive numbers of the data change to be negative numbers, or negative numbers of the data change to be positive numbers, because high order bits of the data greatly change. As a result, a large amount of power is consumed in the external bus 119.

FIG. 8 shows the number of bits whose states have changed on the terminals 111 and 112 in the case where the data is transferred by the data transfer device of Example 1. Assume that data of 2, 4, −1, −2, 3 and −2 in decimal notation are sequentially transferred from the integrated circuit 101 to the integrated circuit 113 via the external bus 119 from time n to time n+5. Herein, the data of negative numbers are represented in a two's complement device. According to the data transfer device of Example 1, the data is subjected to bit inversion so that the state changes of the terminals 111 and 112 are diminished. With this operation, the number of bits whose states change on the terminals 111 and 112 can be greatly reduced. As a result, it is possible to reduce the power consumed in the terminals 111 and 112.

In this example, the data is 8 bits in width. The larger the bit width gets, the greater the reduction offset in power consumption owing to the data transfer device of Example 1 becomes. This is because the larger the bit width is, the larger the number of varying high order bits of the data becomes when negative numbers of the data change to be positive numbers or when positive numbers of the data change to be negative numbers.

FIG. 9 shows the reduction effect in power consumption owing to the data transfer device of Example 1 in the case where the data to be transferred from the integrated circuit 101 to the integrated circuit 113 via the external bus 119 is random 8-bit data. For example, in the case where the transfer data is an instruction code of a computer, it may be considered that an 8-bit bit pattern statistically occurs in a random manner.

In FIG. 9, case 1 shows the case where the number of bits which agree with each other between two successive data transfers is 1 (that is, the number of bits which disagree is 7). The eight patterns of the numbers can cause the case 1 because the number of combinations obtained by selecting one item from eight items is $_8C_1=8$. Therefore, a probability of occurrence of the case 1 is 8/256=0.031.

Therefore, regarding case 1, an average number of changing bits due to a conventional data transfer device is: the number of disagreeing bits (7)×probability of occurrence (0.031)=0.219. Herein, the conventional data transfer device indicates a data transfer device for number 8-bit transfer data without performing a bit inversion operation regardless of the cases 0 through 8. On the other hand, an average number of changing bits due to the data transfer device according to Example 1 is: the number of disagreeing bits (1)×probability of occurring (0.031)=0.031 because the data is transferred after being subjected to inversion in this case. In this way, according to the data transfer device of Example 1, the average number of changing bits can be reduced by 86% regarding case 1.

According to the conventional data transfer device, the average number of changing bits obtained by summing up the average number of changing bits regarding the cases 0 through 8 is 4. On the other hand, the average number of changing bits according to the data transfer device of Example 1 is 2.906. Thus, the terminal 111 is changed 2.906 bits on the average for each transfer. Moreover, in view of the state change of the terminal 112, the average number of changing bits as a whole is 2.906+0.363=3.269. This is because the state of the terminal 112 changes in the cases 0 through 3 and therefore an average number of changing bits of the terminal 112 is: (1+8+28+56)/256=0.363. Thus, the terminals 111 and 112 change by 3.269 bits on the average for each transfer. As described above, according to the data transfer device according to Example 1, the average number of changing bits as a whole can be reduced by 18%. By reducing the average number of changing bits as a whole, the power consumed in the terminals 111 and 112 can be reduced.

EXAMPLE 2

Figure 10:
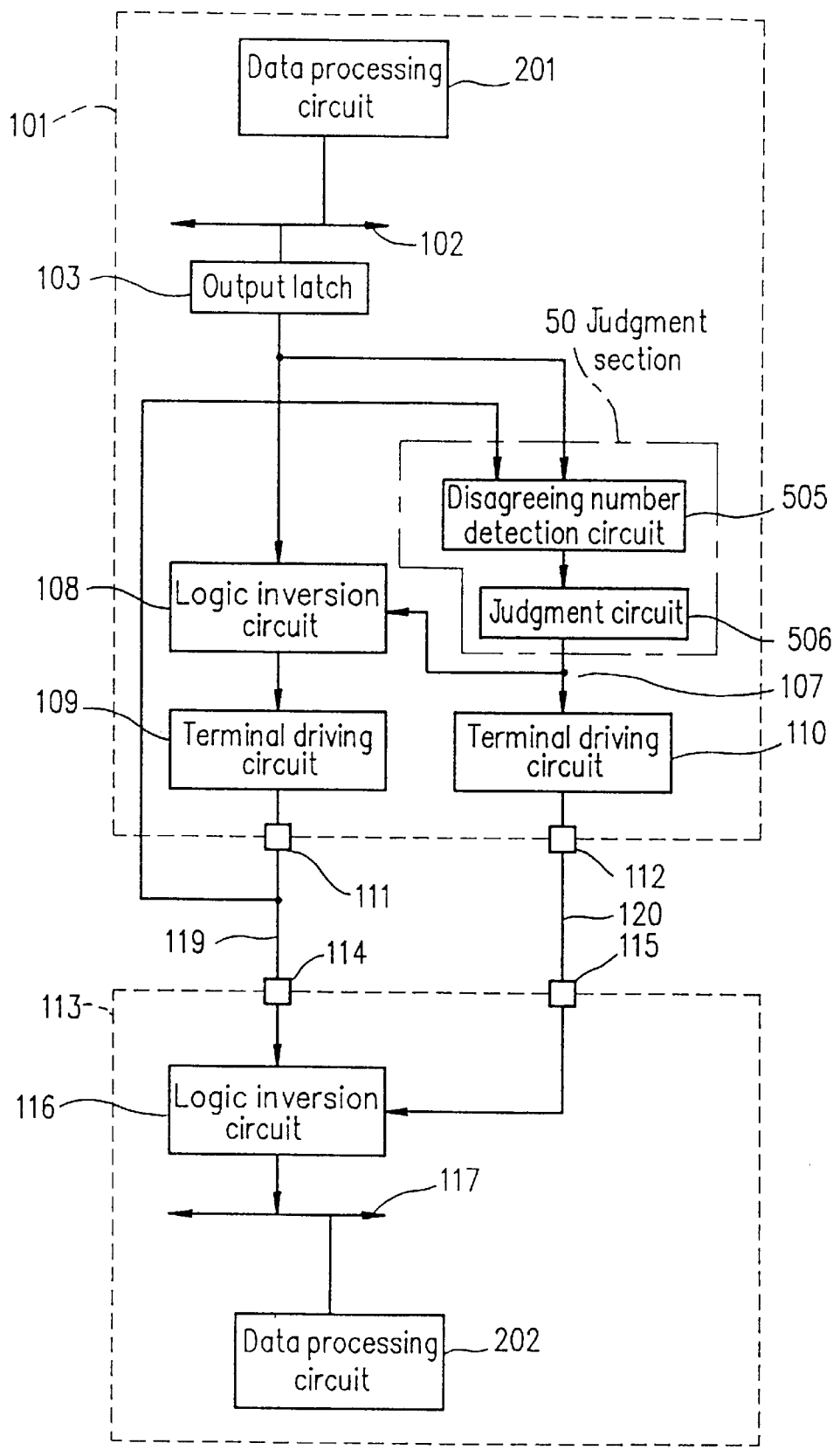
FIG. 10 is a diagram showing a configuration for a data transfer device according to Example 2 of the present invention.

FIG. 10 shows a configuration of Example 2 of a data transfer device according to the present invention. In FIG. 10, the same components as those in FIG. 3 are denoted by the same reference numerals, and the description thereof is herein omitted.

The configuration of the data transfer device according to Example 2 is effective in the case where the state of the external bus 119 is maintained until the next data is written to the output latch 103.

In Example 2, a disagreeing number detection circuit 505 and a judgment circuit 506 function as a judgment section 50. The judgment section 50 judges whether or not the state change of the external bus 119, which occurs in the case where data whose logic level is inverted is output to the external bus 119, is smaller than the state change of the external bus 119, which occurs in the case where the data is output to the external bus 119 without inverting the logic level of the data, or not. Then, the judgment section 50 outputs the judgment signal 107 indicating the result of judgment.

The disagreeing number detection circuit 505 compares an output of the output latch 103 with the state of the external bus 119 for each bit, and outputs the number of disagreeing bits between the output of the output latch 103 and the state of the external bus 119. The judgment circuit 506 outputs the judgment signal 107 in accordance with the output of the disagreeing number detection circuit 505.

FIG. 11 shows the logic which defines the operation of the judgment circuit 506. As shown in FIG. 11, the operation of the judgment circuit 506 is defined, depending on each of the cases A and B. For example, case A shows the operation of the judgment circuit 506 when the disagreeing number detection circuit 505 outputs any one of 0, 1, 2 or 3 in the current judgment. In this case, the judgment circuit 506 outputs a judgment signal having a logic level 0 as the current judgment signal 107. Case B shows the operation of the judgment circuit 506 when the disagreeing number detection circuit 505 outputs any one of 4, 5, 6, 7 or 8. In this case, the judgment circuit 106 outputs a judgment signal having a logic level 1 as the current signal 107.

Next, the operation of the data transfer device of Example 2 will be described.

After the data to be output to the external bus 119 is written to the output latch 103, the disagreeing number detection circuit 505 compares the output of the output latch 103 with the state of the external bus 119 for each bit, thereby outputting the number of bits which disagree between the output of the output latch 103 and the state of the external bus 119. The judgment circuit 506 receives the output of the disagreeing number detection circuit 505 to output the judgment signal 107 in accordance with the logic shown in FIG. 11. For example, assume that the output of the output latch 103 is b'10101010 and the state of the external bus 119 is b'10101000. In this case, the disagreeing number detection circuit 505 compares the output b'10101010 of the output latch 103 with the state b'10101000 of the external bus 119 for each bit, thereby outputting a value 1. The value 1 indicates the number of bits which disagree between the output b'10101010 of the output latch 103 and the state b'10101000 of the external bus 119. The judgment circuit 506 judges that the current state corresponds to case A in FIG. 11, and outputs the judgment signal 107 having a logic level 0. Assuming that the output of the output latch 103 is b'10101010 and the state of the external bus 119 is b'00000000. In this case, the disagreeing number detection circuit 505 compares the output b'10101010 of the output latch 103 with the state b'00000000 of the external bus 119 for each bit, thereby outputting a value 4. The value 4 indicates the number of bits which disagree between the output b'10101010 of the output latch 103 and the state b'00000000 of the external bus 119. The judgment circuit 506 judges that the current state corresponds to case B of FIG. 11, and outputs the judgment signal 107 having a logic level 1. Since the succeeding operations of the data transfer device are the same as those in Example 1, the description thereof is herein omitted.

Figure 12:
FIG. 12 shows an example of the operation of the data transfer device of Example 2 in a time series.

FIG. 12 shows examples of the operation of the data transfer device according to Example 2 in a time series. FIG. 12 shows the relationship between the data output from the output latch 103 and the state change of the external bus 119 at times 1, 2, 3, 4 and 5, respectively.

Figure 13:
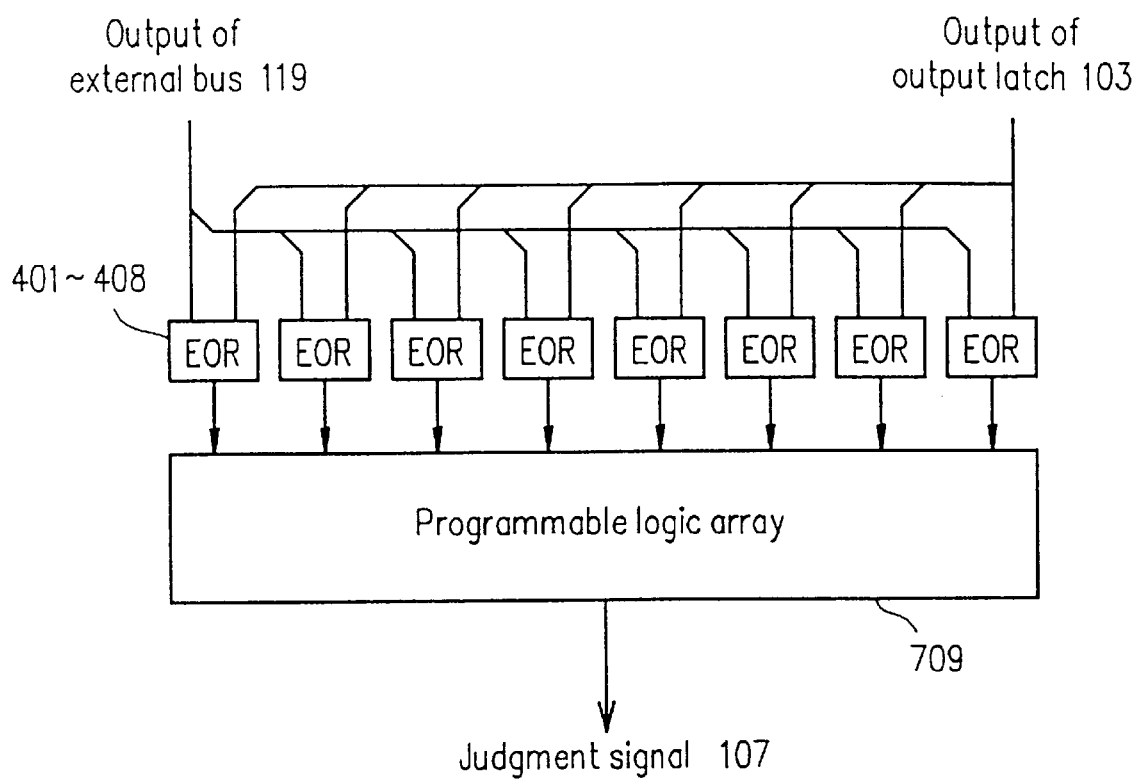
FIG. 13 is a diagram showing a configuration for a disagreeing number detection circuit 505 and the judgment circuit 506 in the data transfer device of Example 2.

FIG. 13 shows an example of a circuit configuration of the disagreeing number detection circuit 505 and the judgment circuit 506. The disagreeing number detection circuit 505 is realized by, for example, the exclusive-OR circuits 401 through 408. The exclusive-OR circuits 401 through 408 detect the number of bits which disagree between the output of the output latch 103 and the state of the external bus 119. The judgment circuit 506 is realized by, for example, a programmable logic array 709. The programmable logic array 709 realizes the logic shown in FIG. 11.

As described above, in the data transfer device in Example 2, the judgment circuit 106 judges to which case of the cases A and B in FIG. 11 the current state corresponds, and outputs the judgment signal 107 indicating the result of judgment. The logic inversion circuit 108 manipulates the output of the output latch 103 in accordance with the logic level of the judgment signal 107. In the case where the logic level of the judgment signal 107 is 1, the output of the output latch 103 is inverted by the logic inversion circuit 108, and the thus inverted signal is output to the external bus 119. In the case where the logic level of the judgment signal 107 is 0, the output of the output latch 103 is output to the external bus 119 without being inverted. In this way, the state change of the external bus 119 can be reduced. As a result, the power consumed in the external bus 119 can be also reduced.

Moreover, in Example 2, in order to reduce the state change of the external bus 119, the logic inversion processing alone is performed with respect to the output of the output latch 103. Instead of this processing, the transposition processing of bit order may be performed with respect to the output of the output latch 103. Alternatively, both of the transposition processing of bit order and the logic inversion processing can be used. Moreover, other processing methods may be used together.

In order to realize these processing capabilities, a disagreeing number detection circuit 105, a judgment circuit 106, a logic inversion circuit 108 and the like are required. However, the increase in the power consumption due to these additional circuits is small. This is because the additional circuits are disposed in the integrated circuit, and the processing is a logical operation alone such as bit inversion or transposition of bit order. Moreover, as compared with an increase in the power consumption due to the additional circuits, a reduction in the power consumption due to diminution in the state change of the external bus 119 is remarkably large. In particular, in the case where a bit width of the external bus 119 is large, this tendency becomes conspicuous.

Furthermore, circuits shown in FIG. 10 may be provided for the respective integrated circuits other than the integrated circuit 101 so that integrated circuits other than the integrated circuit 101 are arranged to output data to the external bus 119. With this arrangement, it is possible to reduce the power consumed in the external bus 119 as a whole device. In the case where such an arrangement is adopted, a bus in the three-state form is normally used as the external bus 119. In the case where the external bus 119 is a bus in the three-state form, the bus is rendered to be in a high-impedance state, whereby the content of the bus is held for a while. Therefore, the disagreeing number detection circuit 505 can monitor the state of the external bus 119 with ease.

The same effects as these described with reference to FIGS. 7 through 9 can be obtained by the data transfer device according to Example 2.

EXAMPLE 3

Figure 14:
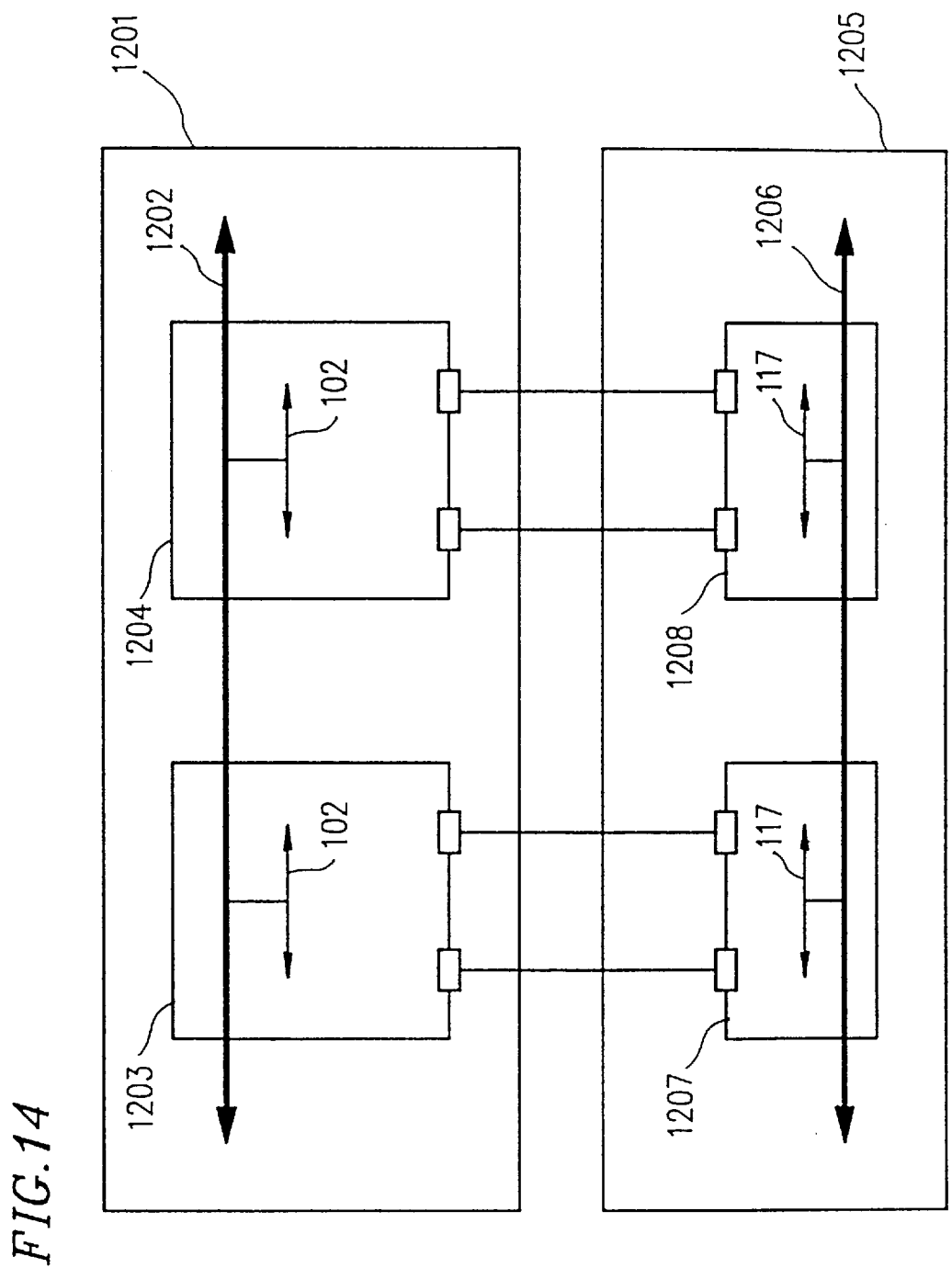
FIG. 14 is a diagram showing a configuration for a data transfer device according to Example 3 of the present invention.

FIG. 14 shows the configuration for a data transfer device of Example 3 according to the present invention. The data transfer device has integrated circuits 1201 and 1205.

The integrated circuit 1201 has a 16-bit entire bus 1202 and integrated circuits 1203 and 1204. The configuration of the integrated circuit 1203 is the same as that of the integrated circuit 101 shown in FIGS. 3 and 10 except that the internal bus 102 is connected to the high order 8 bits of the entire bus 1202. The configuration of the integrated circuit 1204 is the same as that of the integrated circuit 101 shown in FIGS. 3 and 10 except that the internal bus 102 is connected to the low order 8 bits of the entire bus 1202.

The integrated circuit 1205 has a 16-bit entire bus 1206 and integrated circuits 1207 and 1208. The configuration of the integrated circuit 1207 is the same as that of the integrated circuit 113 shown in FIGS. 3 and 10 except that the internal bus 117 is connected to the high order 8 bits of the entire bus 1206. The configuration of the integrated circuit 1208 is the same as that of the integrated circuit 113 shown in FIGS. 3 and 10 except that the internal bus 117 is connected to the low order 8 bits of the entire bus 1206.

Next, the operation of the data transfer device having the above configuration will be described. The high order 8 bits out of 16 bits to be transferred via the entire bus 1202 are transferred from the integrated circuit 1203 to the integrated circuit 1207. The low order 8 bits out of 16 bits to be transferred via the entire bus 1202 are transferred form the integrated circuit 1204 to the integrated circuit 1208. The transfer operation from the integrated circuit 1203 to the integrated circuit 1207 and the transfer operation from the integrated circuit 1204 to the integrated circuit 1208 are the same as those described above with reference to FIGS. 3 and 10. The 8-bit data output from the internal bus 117 of the integrated circuit 1207 and the 8-bit data output from the internal bus 117 of the integrated circuit 1208 are output from the entire bus 1206 as a piece of 16-bit data.

FIG. 15 shows the reduction effects of the power consumption owing to the data transfer device of Example 3. As shown in FIG. 15, in the case where 16-bit data is transferred by a conventional data transfer device, the average number of changing bits obtained by summing up the average number of changing bits regarding the cases 0 through 16 is 8. Herein, the conventional data transfer device indicates a data transfer device for transferring 16-bit data without performing the bit inversion operation regardless of cases 0 through 16.

On the other hand, when 16-bit data is transferred by the data transfer device of Example 1 or 2, the average number of changing bits is bound to be 6.429 by the calculation similar to that described above with reference to FIG. 9. Furthermore, in view of the state change of the signal line 120, the average number of changing bits as a whole is: 6.429+0.402=6.831.

Moreover, in the case where 16-bit data is transferred in a divided form of two sets of 8-bit data by the data transfer device according to Example 3, an average number of changing bits is obtained by doubling the average number of changing bits 3.269 in the case where 8-bit data is transferred by the data transfer device of Example 1 or 2. Thus, the average number of changing bits is 6.538.

As described above, according to the data transfer device of Example 3, the average number of changing bits can be reduced by 18% as compared with the case where 16-bit data is transferred by the conventional data transfer device. Furthermore, as compared with the case where 16-bit data is transferred by the data transfer device according to Example 1 or 2, the average number of changing bits can be reduced by 4%. By reducing the average number of changing bits, the power consumed in the bus connecting the integrated circuits 1201 and 1205 to each other can also be reduced.

EXAMPLE 4

Hereinafter, Example 4 of a data transfer device according to the present invention will be described. The data transfer device of Example 4 is an example of a data transfer device for reducing the power consumption by transposition of bit order.

FIG. 16 shows the principle of reducing the power consumption by transposition of bit order in the case where two sets of data are sequentially transferred. Assume that 2-bit data (d0, d1) is transferred. In the case where bit order of the data (d0, d1) is not transposed, the data (d0, d1) is transferred. In the case where bit order of the data (d0, d1) is transposed, data (d1, d0) is transferred.

For example, case g shows the case where the preceding transfer data is (0, 1) and the current transfer data is (1, 0). In case g, the number of state changes of bits in the case where the bit order is transposed, is smaller than that in the case where the bit order is not transposed. Therefore, the reduction offcots in the power consumption can be obtained by transposition of bit order. Case j shows the case where the preceding transfer data is (1, 0) and the current transfer data is (0, 1). In case j, the number of state changes of bits in the case where the bit order is transposed, is smaller than that in the case where the bit order is not transposed. Therefore, the reduction effect in the power consumption can be obtained by transposition of bit order.

Figure 17:
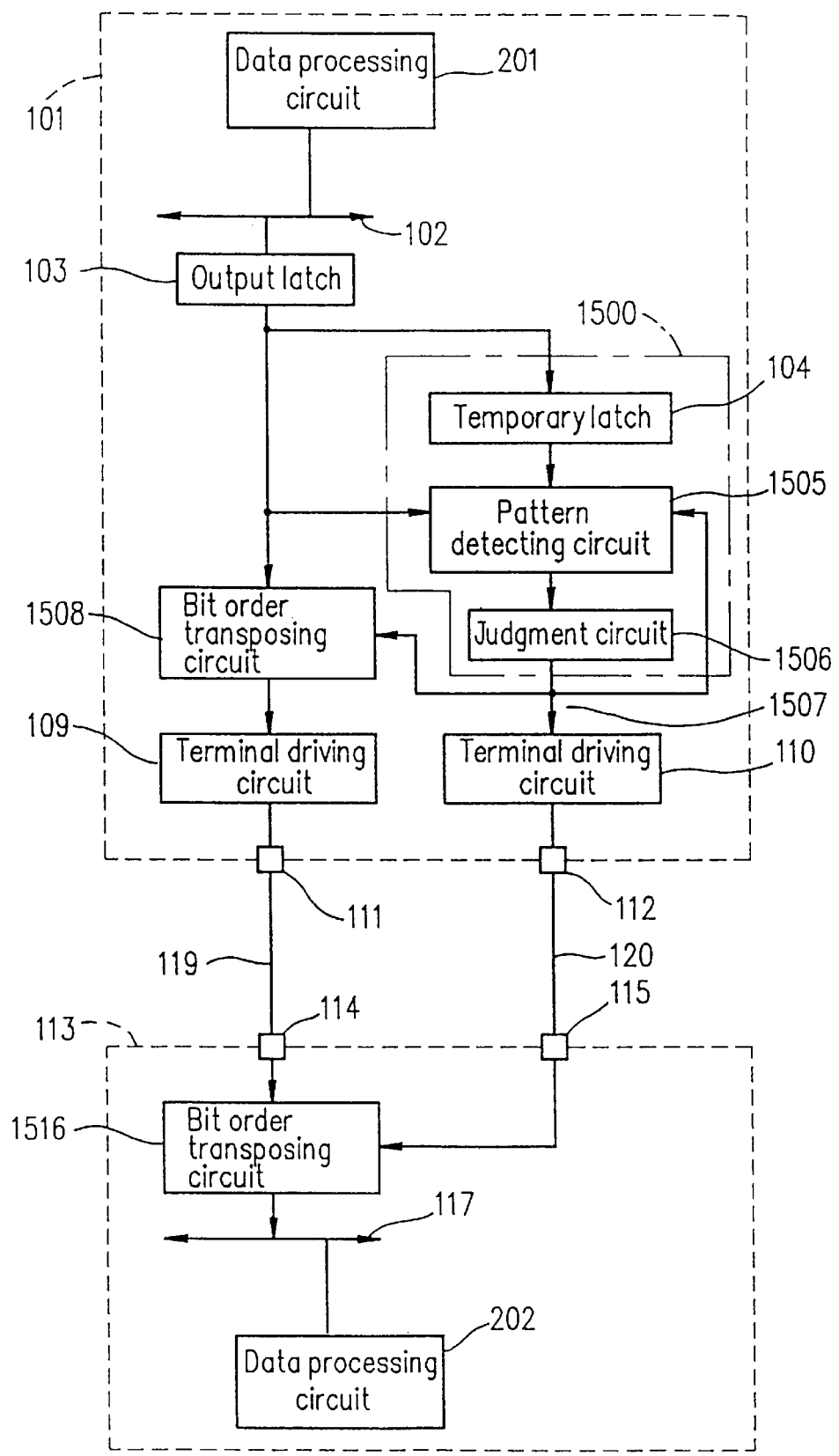
FIG. 17 is a diagram showing a configuration for a data transfer device according to Example 4 of the present invention.

FIG. 17 shows a configuration of Example 4 of the data transfer device according to the present invention. The data transfer device of Example 4 is based on the above-mentioned principle of reducing the power consumption by transposition of bit order. In FIG. 17, the same components as those shown in FIG. 3 are denoted by the same reference numerals, and the description thereof is herein omitted.

A judgment section 1500 judges whether or not the state change of external bus 119, which occurs in the case where 8-bit data (d6, d7, d4, d5, d2, d3, d0, d1) obtained by transposing the bit order every two adjacent bits is output to the external but 119, is smaller than the state change of the external bus 119, which occurs in the case where 8-bit data (d7, d6, d5, d4, d3, d2, d1, d0) is output to the external but 119 without transposing the bit order. Then, the judgment section 1500 outputs a judgment signal 1507 indicating the result of judgment. The judgment section 1500 includes the temporary latch 104, a pattern detecting circuit 1505 and a judgment circuit 1506.

The pattern detecting circuit 1505 outputs the number of pairs of bits out of four pairs of bits (d7, d6), (d5, d4), (d3, d2) and (d1, d0), which corresponds to the case g or j shown in FIG. 16, based on the preceding judgment signal 1507, the output of the output latch 103 and the output of the temporary latch 104.

The judgment circuit 1506 outputs the judgment signal 1507, based on the output of the pattern detecting circuit 1505. The operation of the judgment circuit 1506 will be described below.

A bit order transposing circuit 1508 manipulates the output of the output latch 103 in accordance with the judgment signal 1507 output from the judgment circuit 1506. In the case where the judgment signal 1507 is at a logic 1, the bit order transposing circuit 1508 transposes the bit order of the output of the output latch 103. As a result, data (d6, d7, d4, d5, d2, d3, d0, d1) is output. In the case where the judgment signal 1507 is at a logic 0, the bit order transposing circuit 1508 allows the output of the output latch 103 to pass through without transposing the bit order. As a result, data (d7, d6, d5, d4, d3, d2, d1, d0) is output.

The terminal driving circuit 109 drives the terminal 111 in order to output the output of the bit order transposing circuit 1508 to the exterior of the integrated circuit 101. The terminal driving circuit 110 drives the terminal 112 in order to output the judgment signal 1507 output from the judgment circuit 1506, to the exterior of the integrated circuit 101.

The terminal 111 is connected to the terminal 114 via the external bus 119. The terminal 112 is connected to the terminal 115 via the signal line 120.

A bit order transposing circuit 1516 receives 8-bit data via the terminal 114, and manipulates the 8-bit data in accordance with the logic level of the terminal 115. In the case where the logic level of the terminal 115 is 1, the bit order transposing circuit 1516 transposes the bit order of the 8-bit data. In the case where a logic level of the terminal 115 is 0, the bit order transposing circuit 1516 allows the 8-bit data to pass through without transposing the bit order.

FIG. 18 shows the logic defining the operation of the judgment circuit 1506. As defined in FIG. 18, the operation of the judgment circuit 1506 is defined, depending on cases A and B. Case A shows the operation of the judgment circuit 1506 in the case where the pattern detecting circuit 1505 outputs either 0 or 1. In this case, the judgment circuit 1506 outputs the judgment signal 1507 having a logic level 0. The case B shows the operation of the judgment circuit 1506 in the case where the pattern detecting circuit 1505 outputs either 2 or 3. In this case, the judgment circuit 1506 outputs the judgment signal 1507 having a logic level 1.

Figure 19:
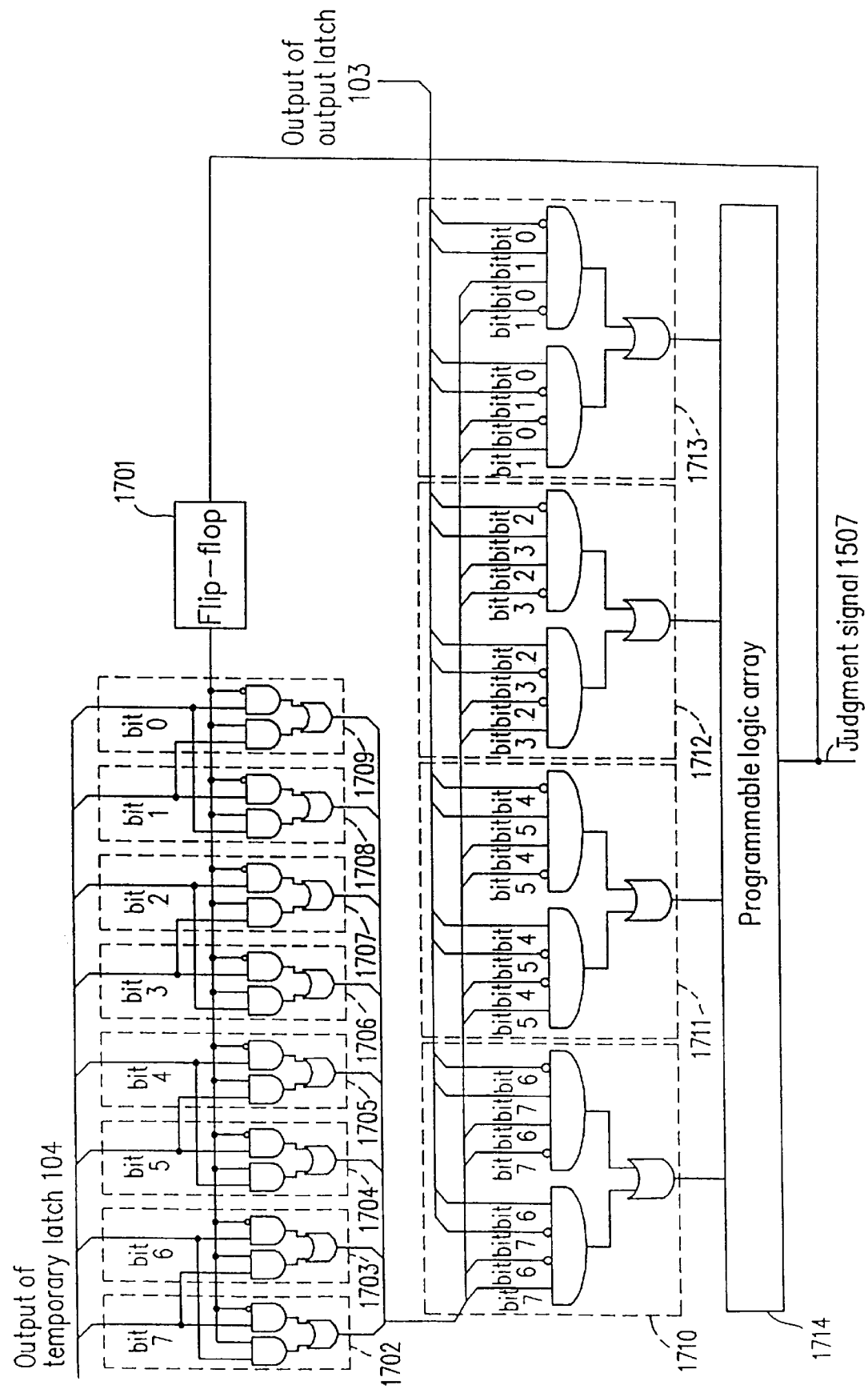
FIG. 19 is a diagram showing a configuration for a pattern detection circuit 1505 and the judgment circuit 1506 in the data transfer device of Example 4.

FIG. 19 shows a circuit configuration of the pattern detecting circuit 1505 and the judgment circuit 1506. The pattern detecting circuit 1505 is realized by, for example, a flip-flop 1701, logic gates 1702 through 1709 and 1710 through 1713. The judgment circuit 1506 is realized by, for example, a programmable logic array 1714.

The flip-flop 1701 delays the judgment signal 1507 output from the programmable logic array 1714.

The logic gates 1702 through 1709 determine whether the bit order of the output of the temporary latch 104 should be transposed or not, depending on the output of the flip-flop 1701. In the case where the output of the flip-flop 1701 is a logic 1, the logic gates 1702 through 1709 transpose the bit order of the output of the temporary latch 104. As a result, data (d6, d7, d4, d5, d2, d3, d0, d1) is output from the logic gates 1702 through 1709. In the case where the output of the flip-flop 1701 is a logic 0, the logic gates 1702 through 1709 allow the output of the temporary latch 104 to pass through without transposing the bit order. As a result, data (d7, d6, d5, d4, d3, d2, d1, d0) is output from the logic gates 1702 through 1709.

The logic gates 1710 through 1713 compare the output of the logic gates 1702 through 1709 with the output of the output latch 103 to output the number of pairs of bits out of four pairs of bits (d7, d6), (d5, d4), (d3, d2) and (d1, d0), which corresponds to the case g or j shown in FIG. 16. For example, the number of pairs of bits corresponding to the case g or j is represented by the number of output signal lines having a logic level of 1, out of four output signal lines from the logic gates 1710 through 1713.

The programmable logic array 1714 outputs the judgment signal 1507, based on the output of the logic gates 1710 through 1713. The logic shown in FIG. 18 is realized by the programmable logic array 1714.

Figure 20:
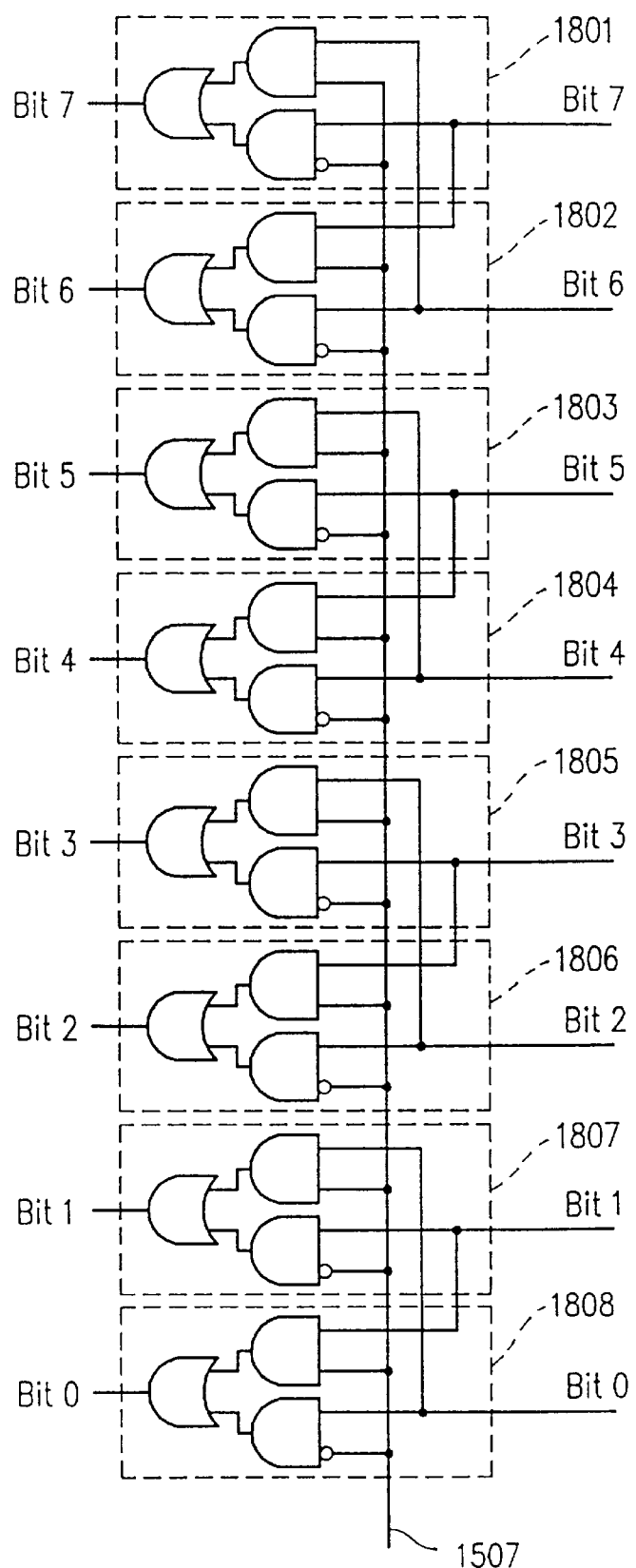
FIG. 20 is a diagram showing a configuration for a bit order transposing circuit 1508 in the data transfer device of Example 4.

FIG. 20 shows an examples of a circuit configuration of the bit order transposing circuit 1508. The bit order transposing circuit 1508 is realized by, for example, logic gates 1801 through 1808. The logic gates 1801 through 1808 determine whether the bit order of input data (d7, d6, d5, d4, d3, d2, d1, d0) should be transposed or not, based on the judgment signal 1507, in the case where the judgment signal 1507 is at a logic 1, the logic gates 1801 through 1808 transpose the bit order of the input data. As a result, data (d6, d7, d4, d5, d2, d3, d0, d1) is output from the logic gates 1801 through 1808. In the case where the judgment signal 1507 is at a logic 0, the logic gates 1801 through 1808 allow the input data to pass through without transposing the bit order. As a result, data (d7, d6, d5, d4, d3, d2, d1, d0) is output from the logic gates 1801 through 1808.

The circuit configuration of the bit order transposing circuit 1516 is the same as that shown in FIG. 20.

Figure 21:
FIG. 21 shows an example of the operation of the data transfer device of Example 4 in a time series.

FIG. 21 shows examples of the operation of the data transfer device according to Example 4 in a time series. Hereinafter, how the data transfer device operates at times 1, 2, 3, 4 and 5 shown in FIG. 5 will be respectively described.

Time 1)

Assuming that b'10101010 is stored in the output latch 103 and the judgment signal 1507 is 0 is at time 1. The output of the output latch 103 passes through the bit order transposing circuit 1508 without transposing the bit order. As a result, the terminal driving circuit 109 drives the external bus 119 with the value of b'10101010.

The judgment signal 1507 of 0 is transferred to the interior of the integrated circuit 113 via the terminal driving circuit 110 and the terminals 112 and 115. Since the bit order transposing circuit 1516 does not perform a transposition operation of bit order, the signal on the external bus 119 passes through the bit order transposing circuit 1516 via the terminal 114, and is transferred to the internal bus 117. In this way, b'10101010, which is stored in the output latch 103, is output to the internal bus 117. The judgment signal 1507 of 0 is held in the flip-flop 1701.

Time 2)

Data b'01010100 is written to the output latch 103 via the internal bus 102 at time 2. Simultaneously with the writing to the output latch 103, b'10101010, which is stored in the output latch 103 until then, is stored in the temporary latch 104. Since the output of the flip-flop 1701 is 0, the logic gates 1702 through 1709 allow the output of the temporary latch 104 to pass through. The output b'10101010 of the logic gates 1702 to 1709 and the output b'01010100 of the output latch 103 are input to the logic gates 1710 through 1713. As a result, logic levels of three output signal lines out of four output signal lines from the logic gates 1710 through 1713 become 1. The judgment signal 1506 judges that the current state corresponds to the case B of FIG. 18, and outputs the judgment signal 1507 of 1.

The bit order of the output of the output latch 103 is transposed by the bit order transposing circuit 1508. As a result, the terminal driving circuit 109 drives the external bus 119 with the value of b'10101000. Since the state of the external bus 119 at time 1 is b'10101010, the state of the external bus 119 is changed by 1 bit due to the current output of b'10101000. As a result, the power corresponding to the state change of 1 bit is consumed.

The judgment signal 1507 of 1 is transferred to the interior of the integrated circuit 113 via the terminal driving circuit 110 and the terminals 112 and 115. Since the bit order transposing circuit 1516 performs a bit order transportation operation, the bit order of the signal on the external bus 119 is transposed by the bit order transposing circuit 1516 via the terminal 114, and is transferred to the internal bus 117. In this way, b'01010100, which is stored in the output latch 103, is output to the internal bus 117. The judgment signal 1507 of 1 is held in the flip-flop 1701.

Time 3)

Data b'01010111 is written to the output latch 103 via the internal bus 102 at time 3. Simultaneously with the writing to the output latch 103, b'01010100, which is stored in the output latch 103 until then, is stored in the temporary latch 104. Since the output of the flip-flop 1701 is 1, the logic gates 1702 through 1709 transpose the bit order of the output of the temporary latch 104. As a result, b'10101000 is output from the logic gates 1702 through 1709. Herein, b'10101000 is the same data as that output to the external bus at time 2. The output b'10101000 of the logic gates 1702 through 1709 and the output b'01010111 of the output latch 103 are input to the logic gates 1710 through 1713. As a result, logic levels of three output signal lines out of four output signal lines from the logic gates 1710 through 1713 become 1. The judgment circuit 1506 judges that the current state corresponds to the base B of FIG. 18, and outputs the judgment signal 1507 of 1.

The bit order of the output of the output latch 103 is transposed by the bit order transposing circuit 1508. The terminal driving circuit 109 drives the external bus 119 with the value of b'10101011. since the state of the external bus 119 is b'10101000 at time 2, the state of the external bus 119 is changed by 2 bits due to this output of b'10101011. As a result, the power corresponding to the state change of 2 bits is consumed.

The judgment signal 1507 of 1 is transferred to the interior of the integrated circuit 113 via the terminal driving circuit 110 and the terminals 112 and 115. Since the bit order transposing circuit 1516 performs a bit order transposing operation, the bit order of the signal on the external bus 119 is transposed by the bit order transposing circuit 1516 via the terminal 114, and is transferred to the internal bus 117. In this way, b'01010111, which is stored in the output latch 103, is output to the internal bus 117. The judgment signal 1507 of 1 is held in the flip-flop 1701.

Time 4)

Data b'10101001 is written to the output latch 103 via the internal bus 102 at time 4. Simultaneously with the writing to the output latch 103, b'01010111, which is stored in the output latch 103 until then, is stored in the temporary latch 104. Since an output of the flip-flop 1701 is 1, the logic gates 1702 through 1709 transpose the bit order of the output of the temporary latch 104. As a result, b'10101011 is output from the logic gates 1702 through 1709. Herein, b'10101011 is the same data as that output to the external bus at time 3. The output b'10101011 of the logic gates 1702 through 1709 and the output b'10101001 of the output latch 103 are input to the logic gates 1710 through 1713. As a result, all logic levels of four output signal lines from the logic gates 1710 through 1713 become 0. The judgment circuit 1506 judges that the current state corresponds to the case A of FIG. 18, and outputs the judgment signal 1507 of 0.

An output of the output latch 103 passes through the bit order transposing circuit 1508. As a result, the terminal driving circuit 109 drives the external bus 119 with the value of b'10101001. Since the state of the external bus 119 at time 3 is b'10101011, the state of the external bus 119 is changed by 1 bit due to the current output of b'10101001. As a result, the power corresponding to the state change of 1 bit is consumed.

The judgment signal 1507 of 0 is transferred to the interior of the integrated circuit 113 via the terminal driving circuit 110 and the terminals 112 and 115. Since the bit order transposing circuit 1516 does not perform a bit order transposing operation, the signal on the external bus 119 passes through the bit order transposing circuit 1516 via the terminal 114 and is transmitted to the internal bus 117. In this way, b'10101001, which is stored in the output latch 103, is output to the internal bus 117.

The transposition of the bit order is not limited to adjacent bits. It is possible to transpose arbitrary bits.

As described above, in the data transfer device of Example 4, the judgment circuit 1506 judges to which of cases A and B in FIG. 18 the current state corresponds, and outputs the judgment signal 1507 indicating the result of judgment. The bit order transposing circuit 1508 manipulates the output of the output latch 103 in accordance with the logic level of the judgment signal 1507. In the case where a logic level of the judgment signal 1507 is 1, the bit order of the output of the output latch 103 is transposed by the bit order transposing circuit 1508. Then, the signal, whose bit order is transposed, is output to the external bus 119. In the case where a logic level of the judgment signal 107 is 0, the signal is output to the external bus 119 without transposing the bit order of the output of the output latch 103. In this way, it is possible to diminish the state change of the external bus 119. As a result, the power consumed in the external bus 119 can be reduced.

EXAMPLE 5

Figure 22:
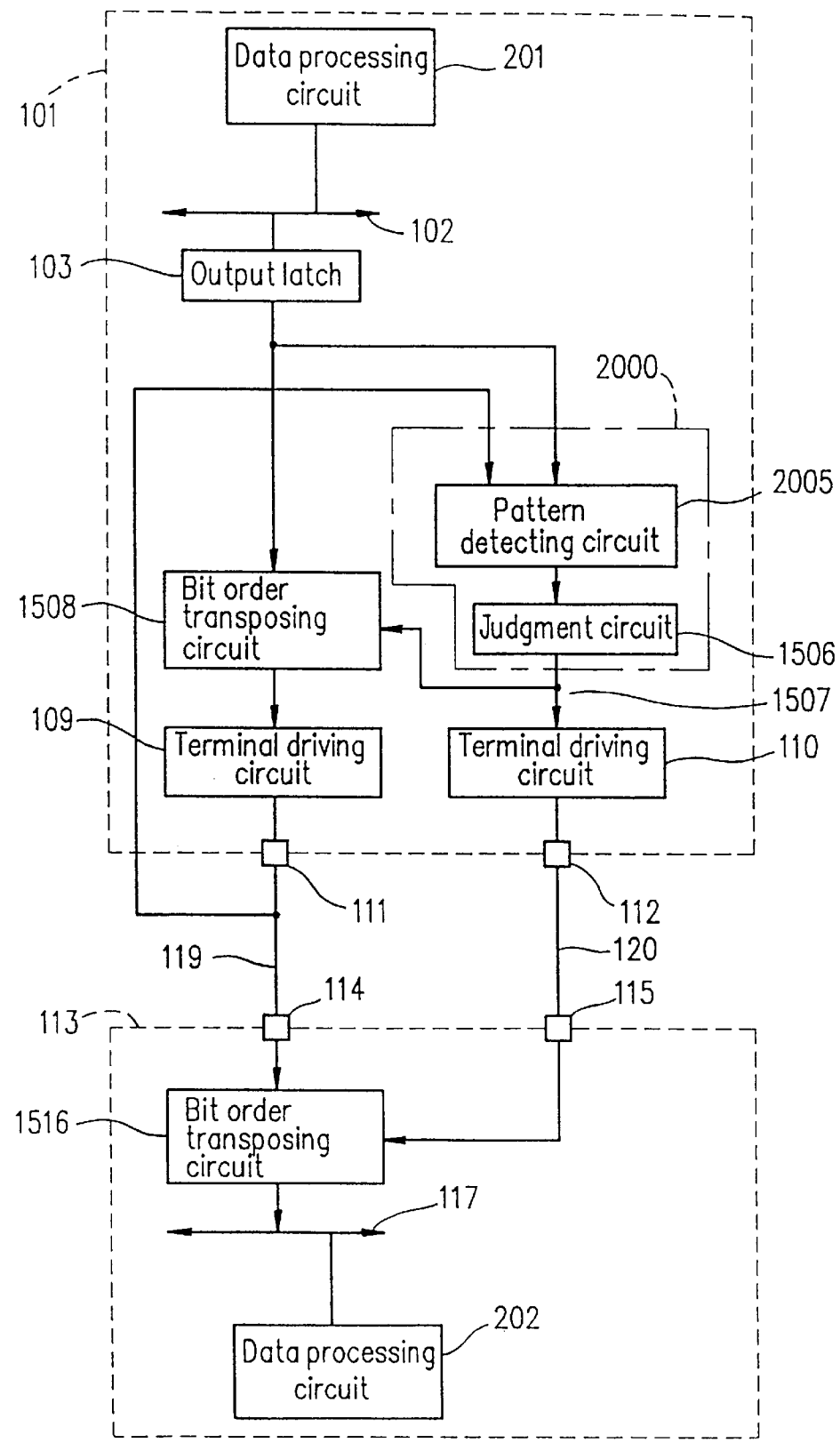
FIG. 22 is a diagram showing a configuration for a data transfer device according to Example 5 of the present invention.

FIG. 22 shows a configuration of Example 5 of a data transfer device according to the present invention. In FIG. 22, the same components as those shown in FIG. 17 are denoted by the same reference numerals, and the description thereof is herein omitted.

The configuration of the data transfer device of Example 5 is effective in the case where the state of the external bus 119 is maintained until the next data is written to the output latch 103.

In Example 5, a pattern detection circuit 2005 and the judgment circuit 1506 function as a judgment section 2000. The judgment section 2000 judges whether or not the state change of the external bus 119, which occurs in the case where data whose bit order is transposed is output to the external bus 119, is smaller than that which occurs in the case where data is output to the external bus 119 without transposing the bit order of the data. Then, the judgment section 2000 outputs judgment signal 1507 indicating the result of judgment.

The pattern detecting circuit 2005 differs from the pattern detecting circuit 1505 shown in FIG. 17 in that the pattern detecting circuit 2005 directly feedbacks the state of the external bus 119 to input the state, instead of inputting the output of the temporary latch 104. However, since the operation of the pattern detecting circuit 2005 is the same as that of the pattern detecting circuit 1505 shown in FIG. 17, the description thereof is herein omitted.

Figure 23:
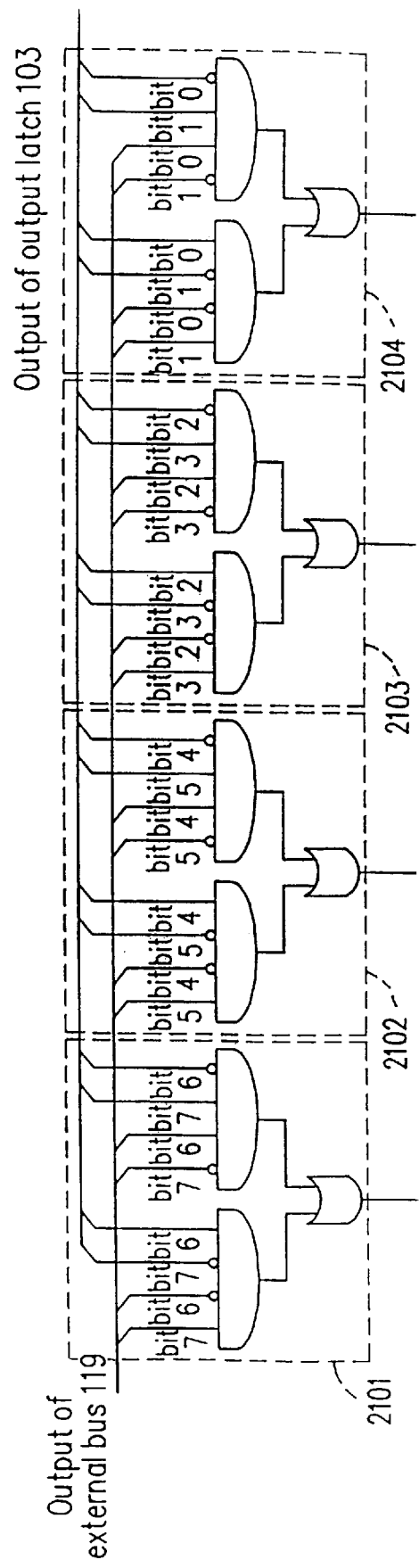
FIG. 23 is a diagram showing a pattern detecting circuit 2005 in the data transfer device of Example 5.

FIG. 23 shows an example of a circuit configuration of the pattern detecting circuit 2005. The pattern detecting circuit 2005 is realized by, for example, logic gates 2101 through 2104. The logic gates 2101 through 2104 compare the output of the external bus 119 with the output of the output latch 103, thereby outputting the number of pairs of bits out of four pairs of bits (d7, d6), (d5, d4), (d3, d2) and (d1, d0) shown in FIG. 16, which corresponds to the case g or j. For example, the number of pairs of bits, which corresponds to the case g or j, is represented by the number of output signal lines whose logic levels are 1, out of four output signal lines from the logic gates 2101 through 2104.

In the case where cyclic data is sequentially transferred as key scan, it is preferable that the data transfer devices of Examples 4 and 5 are used because the state change of the external bus 119 can be reduced by transposing the bit order of the transfer data. For example, a series of data such as b'10001000, b'01000100, b'00100010, and b'00010001 can be given as an example of cyclic data.

Furthermore, some data transfer devices can be obtained by combining the data transfer device of Example 1 or 2 with the data transfer device of Example 4 or 5. The bit inversion operation and the bit order transposing operating may be performed at the same time so as to transfer data by either of the operations, in which the state change of the external bus 119 is smaller than that in the other operation. In this case, the signal lone 120 is required to have not 1-bit width but 2-bit width because the signal line 120 should distinguishably designate the bit inversion operation and the bit order transposing operation. Alternatively, the bit inversion operation may be followed by the bit order transposing operation, or the bit order transposing operation may be followed by the bit inversion operation so as to transfer data by either of the operations, in which the state change of the external bus 119 is smaller than that in the other operation. Also in this case, the signal line 120 is required to have not 1-bit width but 2-bit width because the signal line 120 should distinguishably designate the bit inversion operation and the bit order transposing operation.

Moreover, if the integrated circuit 101 prepared a predetermined data compression method and the integrated circuit 113 prepares a predetermined data expansion method corresponding to the predetermined data compression method, either uncompressed data or compressed data, which causes the smaller state change of the external bus 119, may be transferred via the external bus 119, and 1 bit indicating whether the data is to be compressed or not may be transferred via the signal line 120 by using the predetermined data compression method. The integrated circuit 113 recovers the original data by using the predetermined data expansion method if required.

Furthermore, if the integrated circuit 101 prepares a plurality of kinds of data compression methods and the integrated circuit 113 prepares a plurality of kinds of data expansion methods, the compressed data may be transferred via the external bus 119, and the kind of data compression method used for compressing the data may be transferred via the signal line 120. The integrated circuit 113 receives the compressed data, and expands the data by using an expansion method corresponding to the compression method, thereby recovering the original data. In the case where the integrated circuit prepares $2^n$ kinds of data compression methods, the signal line 120 is required to have at least an n-bit width.

According to the data transfer device and the data transfer method of the present invention, it is judged whether or not the state change of the bus, which occurs in the case where the data is manipulated to be output to the bus, is smaller than the state change of the bus, which occurs in the case where data is output to the bus without manipulating the data.

The data is manipulated based on the result of judgment. Moreover, either the unmanipulated data or the manipulated data is selectively output to the bus. With this operation, it is possible to reduce the state change of the bus accompanied by data transfer. As a result, the power, which is consumed in the bus, is reduced.

Various other modifications will be apparent to and can be readily made by those skilled in the art without departing from the scope and spirit of this invention. Accordingly, it is not intended that the scope of the claims appended hereto be limited to the description as set forth herein, but rather that the claims be broadly construed.

What is claimed is:

1. A data transfer device connected to a bus and a control signal line, comprising:

judgment means for judging whether or not a state change of data on the bus, which occurs in a case where the data is manipulated to be output to the bus, is smaller than a state change of data on the bus, which occurs in a case where data is output to the bus without manipulating the data;

first manipulation means for manipulating the data in accordance with the result of judgment;

first output means for selectively outputting either the data or the data manipulated by the first manipulation means to the bus in accordance with the result of judgment; and second output means for outputting a control signal indicating the result of judgment to the control signal line, wherein the judgment means comprises determination means for determining whether the current data is to be manipulated or not in accordance with a current state of the bus and the current data.

2. A data transfer device connected to a bus and a control signal line, comprising:

judgment means for judging whether or not a state change of data on the bus, which occurs in a case where the data is manipulated to be output to the bus, is smaller than a state change of data on the bus, which occurs in a case where data is output to the bus without manipulating the data;

first manipulation means for manipulating the data in accordance with the result of judgment;

first output means for selectively outputting either the data or the data manipulated by the first manipulation means to the bus in accordance with the result of judgment; and second output means for outputting a control signal indicating the result of judgment to the control signal line, wherein the judgment means comprises:

first holding means for holding a preceding result of judgment;

second holding means for holding the preceding data upon receiving current data; and determination means for determining whether the current data is to be manipulated or not in accordance with the preceding result of judgment, the preceding data and the current data.

3. A data transfer device according to claim 2, wherein the determination means comprises:

disagreeing number detection means for outputting the number of bits disagreeing between the preceding data and the current data; and means for outputting a signal indicating whether the current data is to be manipulated or not in accordance with the preceding result of judgment and an output of the disagreeing number detection means.

4. A data transfer device according to claim 2, wherein the determination means comprises:

pattern detection means for outputting the number of patterns agreeing with a relationship between the current data and the preceding data, out of a predetermined number of patterns which are previously prepared in accordance with the preceding result of judgment; and means for outputting a signal indicating whether the current data is to be manipulated or not in accordance with an output of the pattern detection means.

5. A data transfer device according to claim 1, wherein the determination means comprises:

disagreeing number detection means for outputting the number of bits disagreeing between the current state of the bus and the current data; and means for outputting a signal indicating whether the current data is to be manipulated or not in accordance with the output of the disagreeing number detection means.

6. A data transfer device according to claim 1, wherein the determination means comprises:

pattern detection means for outputting the number of patterns agreeing with a relationship between the current state of the bus and the current data, out of the predetermined number of patterns which are previously prepared; and means for outputting a signal indicating whether the current data is to be manipulated or not in accordance with the output of the pattern detection means.

7. A data transfer device according to claim 1, wherein the data is part of data supplied to the date transfer device via an entire bus, and a bit width of the bus is smaller than that of the entire bus.

8. A data transfer device according to claim 1, wherein the first manipulation means executes at least one of bit inversion, bit order transposition and data compression.

9. A data transfer device according to claim 1, further includes second manipulation means for receiving data output from the first output means via the bus and the control signal indicating the result of judgment output from the second output means via the control signal line, and for manipulating the data in accordance with the control signal.

10. A data transfer device according to claim 9, wherein the second manipulation means executes at least one of bit inversion, bit order transposition and data expansion.

11. A data transfer device comprising:

a transmission section for transmitting data and a control signal;

a bus connected to the transmission section, for carrying the data;

a control signal line connected to the transmission section, for carrying the control signal; and a receiving section connected to the bus and the control signal line, for receiving the data via the bus and the control signal via the control signal line, wherein the transmission section includes:

judgment means for judging whether or not a state change of data on the bus, which occurs in a case where the data is manipulated to be output to the bus, is smaller than a state change of data on the bus, which occurs in a case where the data is output to the bus without manipulating the data;

first manipulation means for manipulating the data in accordance with the result of judgment;

first output means for selectively outputting either the data or the data manipulated by the first manipulation means, in accordance with the result of judgment; and second output means for outputting a control signal indicating the result of judgment to the control signal line, wherein the judgment means of the transmission section includes:

first holding means for holding a preceding result of judgment;

second holding means for holding the preceding data upon receiving current data; and determination means for determining whether the current data is to be manipulated or not in accordance with the preceding result of judgment, the preceding data and the current data, and wherein the receiving section includes: second manipulation means for receiving data output from the first output means via the bus and the control signal indicating the result of judgment output from the second output means via the control signal line, and for manipulating the data in accordance with the control signal.

12. A data transfer device comprising:

a transmission section for transmitting data and a control signal;

a bus connected to the transmission section, for carrying the data;

a control signal line connected to the transmission section, for carrying the control signal; and a receiving section connected to the bus and the control signal line, for receiving the data via the bus and the control signal via the control signal line, wherein the transmission section includes:

judgment means for judging whether or not a state change of data on the bus, which occurs in a case where the data is manipulated to be output to the bus, is smaller than a state change of data on the bus, which occurs in a case where the data is output to the bus without manipulating the data;

first manipulation means for manipulating the data in accordance with the result of judgment;

first output means for selectively outputting either the data or the data manipulated by the first manipulation means, in accordance with the result of judgment; and second output means for outputting a control signal indicating the result of judgment to the control signal line, wherein the judgment means for the transmission section includes determination means for determining whether current data is to be manipulated or not in accordance with a current state of the bus and the current data, and wherein the receiving section includes: second manipulation means for receiving data output from the first output means via the bus and the control signal indicating the result of judgment output from the second output means via the control signal line, and for manipulating the data in accordance with the control signal.

13. A data transfer method comprising the steps of:

judging whether or not a state change of data on a bus, which occurs in a case where the data is manipulated to be output to the bus, is smaller than a state change of data on the bus, which occurs in a case where data is output to the bus without manipulating the data;

performing a first manipulation of the data in accordance with the result of judgment; and transferring the manipulated data in accordance with the result of judgment, wherein the judgment step comprises a step of determining whether current data is to be manipulated or not in accordance with a current state of the bus and the current data.

14. A data transfer method according to claim 13, wherein the first manipulation includes at least one of bit inversion, bit order transposition and data compression.

15. A data transfer method according to claim 13, further comprising a step of reproducing the data by performing a second manipulation of the data in accordance with the result of judgment, the second manipulation being opposite to the first manipulation.

16. A data transfer method according to claim 15, wherein the second manipulation includes at least one of bit inversion, bit order transposition and data expansion.

17. A data transfer device connected to a bus and a control signal line, comprising:

judgment means for judging whether or not a state change of data on the bus, which occurs in a case where the data is manipulated to be output to the bus, is smaller than a state change of data on the bus, which occurs in a case where data is output to the bus without manipulating the data;

first manipulation means for manipulating the data by executing bit order transposition in accordance with the result of judgment;

first output means for selectively outputting either the data or the data manipulated by the first manipulation means to the bus in accordance with the result of judgment; and second output means for outputting a control signal indicating the result of judgment to the control signal line.

18. A data transfer device according to claim 17, wherein the judgment means comprises determination means for determining whether the current data is to be manipulated or not in accordance with a current state of the bus and the current data.

19. A data transfer device according to claim 18, wherein the determination means comprises:

disagreeing number detection means for outputting the number of bits disagreeing between the current state of the bus and the current data; and means for outputting a signal indicating whether the current data is to be manipulated or not in accordance with the output of the disagreeing number detection means.

20. A data transfer device according to claim 18, wherein the determination means comprises:

pattern detection means for outputting the number of patterns agreeing with a relationship between the current state of the bus and the current data, out of the predetermined number of patterns which are previously prepared; and means for outputting a signal indicating whether the current data is to be manipulated or not in accordance with the output of the pattern detection means.

21. A data transfer device according to claim 17, wherein the data is part of data supplied to the data transfer device via an entire bus, and a bit width of the bus is smaller than that of the entire bus.

22. A data transfer device according to claim 17, further includes second manipulation means for receiving data output from the first output means via the bus and the control signal indicating the result of judgment output from the second output means via the control signal line, and for manipulating the data by executing bit order transposition in accordance with the control signal.

23. A data transfer device comprising:

a transmission section for transmitting data and a control signal;

a bus connected to the transmission section, for carrying the data;

a control signal line connected to the transmission section, for carrying the control signal; and a receiving section connected to the bus and the control signal line, for receiving the data via the bus and the control signal via the control signal line, wherein the transmission section includes:

judgment means for judging whether or not a state change of data on the bus, which occurs in a case where the data is manipulated to be output to the bus, is smaller than a state change of data on the bus, which occurs in a case where the data is output to the bus without manipulating the data;

first manipulation means for manipulating the data by executing bit order transportation in accordance with the result of judgment;

first output means for selectively outputting either the data or the data manipulated by the first manipulation means, in accordance with the result of judgment; and second output means for outputting a control signal indicating the result of judgment to the control signal line, and wherein the receiving section includes: second manipulation means for receiving data output from the first output means via the bus and the control signal indicating the result of judgment output from the second output means via the control signal line, and for manipulating the data by executing bit order transposition in accordance with the control signal.

24. A data transfer method comprising the steps of:

judging whether or not a state change of data on a bus, which occurs in a case where the data is manipulated to be output to the bus, is smaller than a state change of data on the bus, which occurs in a case where data is output to the bus without manipulating the data;

performing a first manipulation of the data by executing bit order transposition in accordance with the result of judgment; and transferring the manipulated data in accordance with the result of judgment.

25. A data transfer method according to claim 24, further comprising a step of reproducing the data by performing a second manipulation of the data in accordance with the result of judgment, the second manipulation being opposite to the first manipulation.

* * * * *